United States Patent
Hohda et al.

(10) Patent No.: US 7,986,850 B2
(45) Date of Patent: Jul. 26, 2011

(54) IMAGE PROCESSING APPARATUS AND METHOD OF CONTROLLING IMAGE PROCESSING APPARATUS

(75) Inventors: Saori Hohda, Kawasaki (JP); Takayuki Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1048 days.

(21) Appl. No.: 11/775,943

(22) Filed: Jul. 11, 2007

(65) Prior Publication Data

US 2008/0013858 A1  Jan. 17, 2008

(30) Foreign Application Priority Data

Jul. 13, 2006  (JP) .................................. 2006-193234

(51) Int. Cl.
*G06K 9/00* (2006.01)
(52) U.S. Cl. ...................................................... 382/254
(58) Field of Classification Search .................. 382/254, 382/274, 275, 279, 278; 348/241, 248, 222.1
See application file for complete search history.

(56) References Cited

U.S. PATENT DOCUMENTS

| | | | | |
|---|---|---|---|---|
| 6,757,014 B1 * | 6/2004 | Kasahara | ...................... | 348/241 |
| 6,791,607 B1 * | 9/2004 | Bilhan et al. | .................. | 348/243 |
| 6,801,254 B1 * | 10/2004 | Nishio | .......................... | 348/241 |
| 6,829,007 B1 * | 12/2004 | Bilhan et al. | .................. | 348/243 |
| 7,825,964 B2 * | 11/2010 | Hoshino et al. | ............... | 348/241 |
| 7,834,917 B2 * | 11/2010 | Kinoshita et al. | ............. | 348/241 |
| 2005/0073597 A1 * | 4/2005 | Rengakuji et al. | ............ | 348/241 |
| 2005/0099505 A1 * | 5/2005 | Suzuki | ....................... | 348/222.1 |
| 2008/0192130 A1 * | 8/2008 | Noh | ............................. | 348/243 |

FOREIGN PATENT DOCUMENTS

| | | | |
|---|---|---|---|
| JP | 07-067038 | | 3/1995 |
| JP | 2002-152600 | | 5/2002 |
| JP | 02005311455 A | * | 11/2005 |

* cited by examiner

*Primary Examiner* — Gregory M Desire
*Assistant Examiner* — Andrae S Allison
(74) *Attorney, Agent, or Firm* — Cowan, Liebowitz & Latman, P.C.

(57) ABSTRACT

A noise elimination method capable of handling even beat noise occurring in an oblique direction is proposed. In an image processing apparatus that is provided with a correcting unit that subtracts cyclic data of beat noise from effective pixel data included in inputted digital image data, the correcting unit comprises: a distributing unit that sequentially and cyclically distributes optical black area pixel data included in the digital image data; an integrating unit to which the optical black area pixel data distributed by the distributing unit is sequentially inputted; a first calculating unit that divides the integration result of the integrating unit by the number of integrations; a minimum value detecting unit that detects a minimum value of the output of the first calculating unit; and a second calculating unit that calculates the minimum value and the division result to obtain the cyclic data of the beat noise.

8 Claims, 21 Drawing Sheets

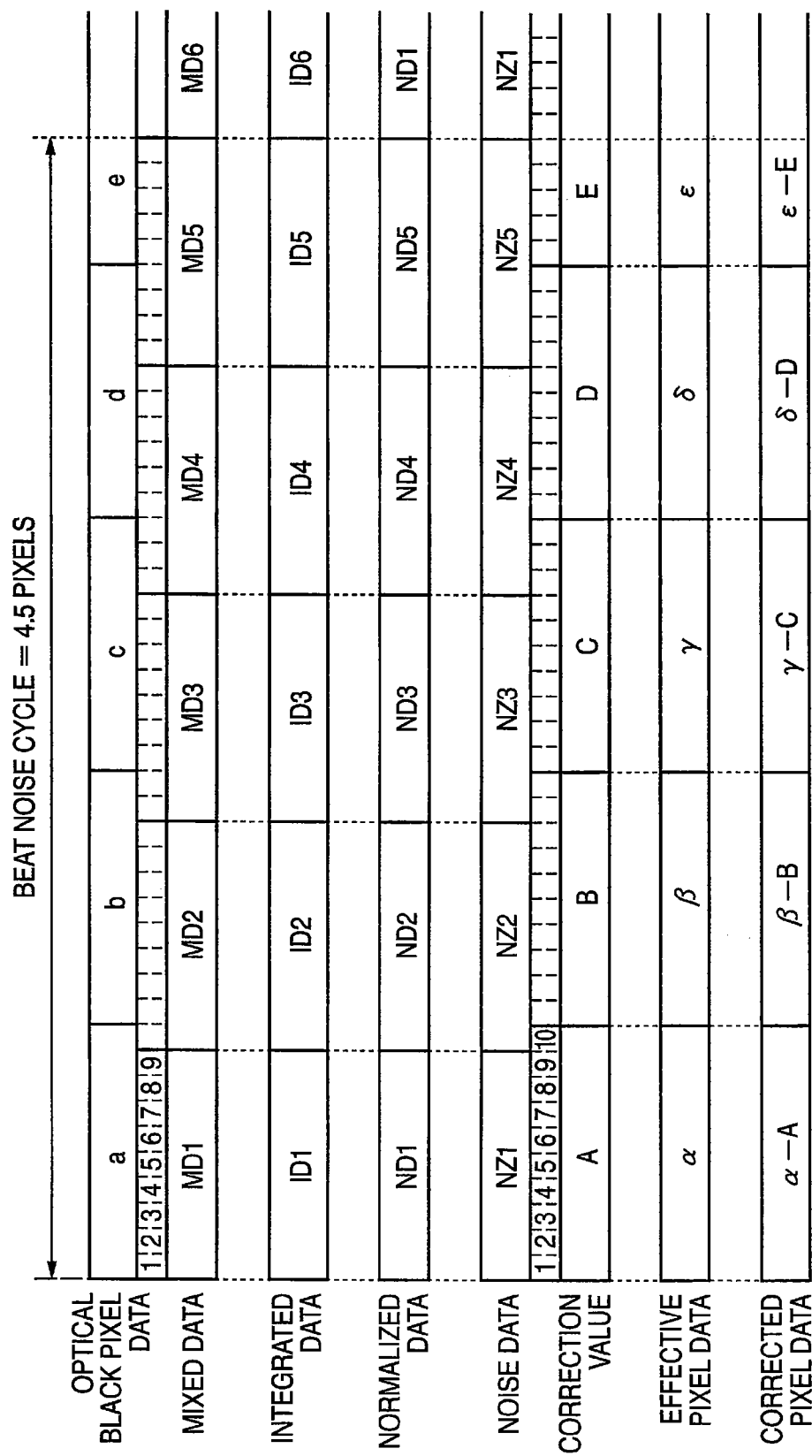

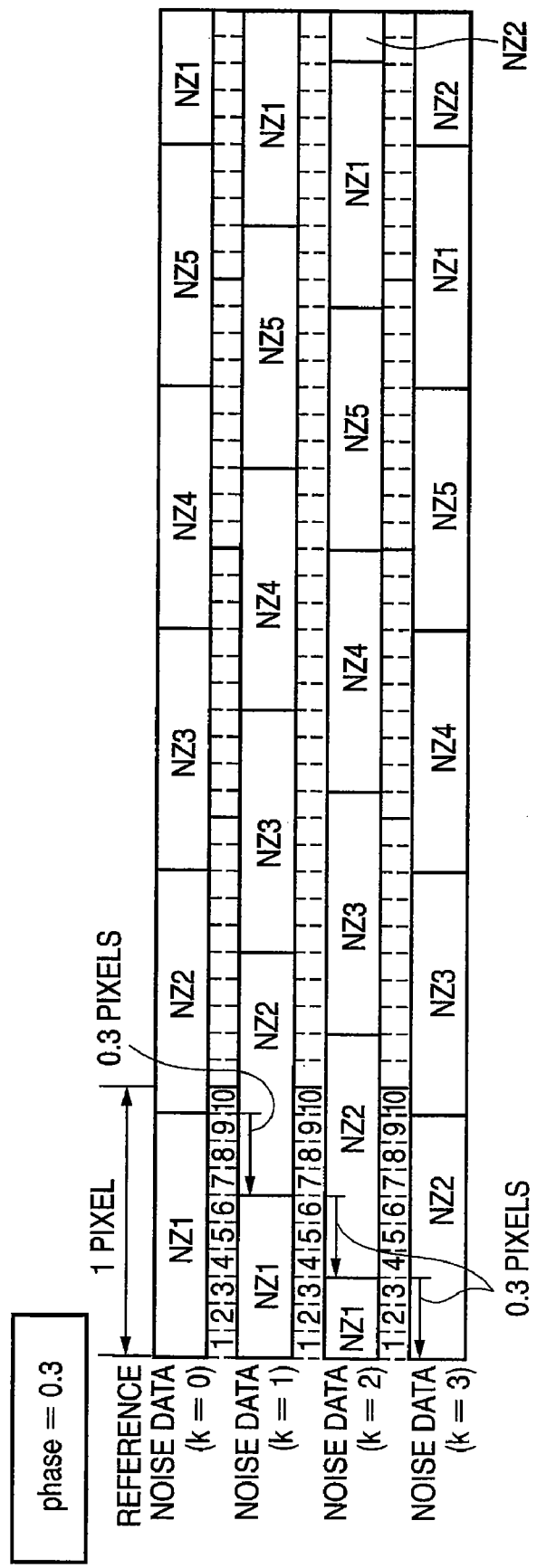

IMAGE PROCESSING APPARATUS AND METHOD OF CONTROLLING IMAGE PROCESSING APPARATUS

BACKGROUND OF THE INVENTION

1. Field of the Invention

The present invention relates to an image processing apparatus and method of controlling an image processing apparatus applicable to an imaging apparatus and the like which captures still images and moving images, and in particular, relates to an image processing apparatus and method of controlling an image processing apparatus capable of eliminating beat noise convoluted on captured visual signals.

2. Description of the Related Art

In recent years, advances have been made in the downsizing and high-pixelization of solid state image sensors such as CCDs that are used in mobile phones and the like. This has resulted in an increase in the drive frequencies of imaging circuits that drive such solid state image sensors. In addition to a drive circuit for a solid state image sensor, an imaging apparatus includes a control system circuit for a CPU and the like, a memory circuit for a DRAM and the like, as well as a display circuit for an LCD and the like. Each of these circuits operates according to clock signals having mutually different high frequencies. With such an imaging apparatus in which a plurality of clock signals having different frequencies exists, there is an unignorable problem in that reduced board sizes due to down-sizing of the apparatus give rise to clock interference between the circuits. Examples of such interference include interference with a horizontal interval of a clock signal, interference between a horizontal interval of a clock signal and power wiring patterns, and interference between a horizontal interval of a clock signal and analog signals. An occurrence of such an interference of a clock signal causes frequency noise of the interfering clock signal to be convoluted on captured visual signals, resulting in a problem of deterioration of the quality of obtained image data.

As for conventional art, for example, Japanese Patent Laid-Open No. 7-67038 proposes an arrangement in which, for the purpose of extracting and canceling noise convoluted on a visual signal, a storage unit is provided which stores image data corresponding to one horizontal interval. The arrangement integrates optical black pixels in the vertical direction of a solid state image sensor over a horizontal interval and stores the integrated results in the storage unit, and subsequently eliminates convoluted noise by subtracting stored image data corresponding to one horizontal interval from effective pixel data.

As for other conventional art, for instance, Japanese Patent Laid-Open No. 2002-152600 proposes a technique for canceling beat noise signals. In this example, a multi-channel clamping circuit is provided which has a plurality of channels corresponding to the number of pixels equivalent to one cycle of a beat noise signal formed by two types of clock signals, and which sequentially integrates signals of each pixel in the optical black area in the capture for each of the plurality of channels. The method used in Japanese Patent Laid-Open No. 2002-152600 eliminates beat noise signals by subtracting this integrated value from input image data.

However, in the conventional example described in Japanese Patent Laid-Open No. 7-67038, since image data of a plurality of horizontal intervals are integrated as a signal corresponding to one horizontal interval, only noise occurring in the vertical direction is extracted. Thus, the conventional example is incapable of handling noise generated in an oblique direction.

In addition, Japanese Patent Laid-Open No. 2002-152600 does not take into consideration a method of processing in a case where the cycle of beat noise signals is not an integral multiple of pixel data. Therefore, the contents proposed in Japanese Patent Laid-Open No. 2002-152600 are insufficient in handling such a case. In practice, there are cases where the cycle of a beat noise signal or an initial phase value is a rational multiple of pixel data. Furthermore, the invention proposed in Japanese Patent Laid-Open No. 2002-152600 is incapable of eliminating a beat noise signal unless the cycle of the beat noise signal is identified in advance. Moreover, this arrangement of conventional art is configured to eliminate noise on a per-pixel basis with respect to image data from a solid state image sensor. However, elimination of beat noise signals cannot be performed on image data photographed by a multi-field read type solid state image sensor and framed on a memory.

SUMMARY OF THE INVENTION

An object of the present invention is to accurately extract beat noise components contained in an image signal in a case where the cycle or the initial phase value of beat noise is not an integral multiple of pixels, and to eliminate beat noise components from the image signal. Another object of the present invention is to enable correction even when the cycle of beat noise contained in image data is unknown.

In order to achieve the above objects, an image processing apparatus according to an embodiment of the present application is provided with a correcting unit that subtracts cyclic data of beat noise from effective pixel data included in inputted digital image data, wherein the correcting unit comprises: a distributing unit that sequentially and cyclically distributes optical black area pixel data included in the digital image data; an integrating unit to which the optical black area pixel data distributed by the distributing unit is sequentially inputted; a first calculating unit that divides the integration result of the integrating unit by the number of integrations; a minimum value detecting unit that detects a minimum value of the output of the first calculating unit; and a second calculating unit that calculates the minimum value and the division result to obtain the cyclic data of the beat noise.

In order to achieve the above objects, an image processing apparatus according to another embodiment of the present application comprises: an A/D converting unit that converts an analog image signal outputted from a multi-field read type solid state image sensor to digital image data; a memory unit that temporarily stores the digital image data outputted from the A/D converting unit; a first selecting unit that selects the digital image data outputted from either the A/D converting unit or the memory unit; and a correcting unit that subtracts cyclic data of beat noise from effective pixel data included in the digital image data selected by the first selecting unit, wherein the image processing apparatus performs, per horizontal interval, synchronization of a horizontal synchronization signal when a next horizontal interval is read out from the solid state image sensor and phase correction corresponding to a read-out field.

In order to achieve the above objects, an image processing apparatus according to yet another embodiment of the present application is provided with an A/D converting unit that digitally converts analog signals transferred from an solid state image sensor and a correcting unit that subtracts cyclic data of beat noise from effective pixels outputted from the A/D converting unit, the image processing apparatus comprises: a distributing unit that distributes a portion of optical black area image data outputted by the A/D converting unit so that the optical black area image data is sequentially integrated by a number of integrators provided so as to match the number of pixel units per cycle of the beat noise; a first calculating unit that divides the integration results of the respective integrators by the number of integrations performed by the integrators; a detecting unit that detects a minimum value of the division results of the first calculating unit; and a second calculating unit that subtracts the minimum value detected by the detecting unit from the division results, wherein the image processing apparatus performs offset elimination of the beat noise by detecting a parameter minimum value from the parameters of the beat noise integrated and normalized by the correcting unit and subtracting the parameter minimum value from the parameters of the beat noise.

In order to achieve the above objects, a method of controlling an image processing apparatus according to another embodiment of the present application is provided with a correcting unit that subtracts cyclic data of beat noise from effective pixel data included in inputted digital image data, wherein the correcting unit comprises: a distributing step for sequentially and cyclically distributing optical black area pixel data included in the digital image data; an integrating step during which the optical black area pixel data distributed in the distributing step is sequentially inputted; a first calculating step for dividing the integration result of the integrating step by the number of integrations; a minimum value detecting step for detecting a minimum value of the output of the first calculating step; and a second calculating step for calculating the minimum value and the division result to obtain the cyclic data of the beat noise.

In order to achieve the above objects, a method of controlling an image processing apparatus according to yet another embodiment of the present application comprises: an A/D converting step for converting an analog image signal outputted from a multi-field read type solid state image sensor to digital image data; a memory step for temporarily storing the digital image data outputted in the A/D converting step; a first selecting step for selecting the digital image data outputted in either the A/D converting step or the memory step; and a correcting step for subtracting cyclic data of beat noise from effective pixel data included in the digital image data selected in the first selecting step, wherein the control method causes, per horizontal interval, synchronization of a horizontal synchronization signal when a next horizontal interval is read out from the solid state image sensor and phase correction corresponding to a read-out field to be performed.

In order to achieve the above objects, a method of controlling an image processing apparatus according to still another embodiment of the present application is provided with an A/D converting unit that digitally converts analog signals transferred from an solid state image sensor and a correcting unit that subtracts cyclic data of beat noise from effective pixels outputted from the A/D converting unit, the control method comprises: a distributing step for distributing a portion of optical black area image data outputted by the A/D converting unit so that the optical black area image data is sequentially integrated by a number of integrators provided so as to match the number of pixel units per cycle of the beat noise; a first calculating step for dividing the integration results of the respective integrators by the number of integrations performed by the integrators; a detecting step for detecting a minimum value of the division results of the first calculating step; and a second calculating step for subtracting the minimum value detected in the detecting step from the division results, wherein the control method causes offset elimination of the beat noise to be performed by detecting a parameter minimum value from the parameters of the beat noise integrated and normalized in the correcting step, and subtracting the parameter minimum value from the parameters of the beat noise.

According to the present invention, it is now possible to eliminate beat noise occurring in an oblique direction in addition to those occurring in a vertical direction. Furthermore, it is now possible to correct beat noise with cycles other than integral multiples of a pixel clock signal.

Further features of the present invention will become apparent from the following description of exemplary embodiments with reference to the attached drawings.

BRIEF DESCRIPTION OF THE DRAWINGS

FIGS. 13A to 13C are diagrams for explaining changes in beat noise frequency with respect to modes of an image processing apparatus according to the second embodiment of the present invention;

DESCRIPTION OF THE EMBODIMENTS

First Embodiment

Figure 1:
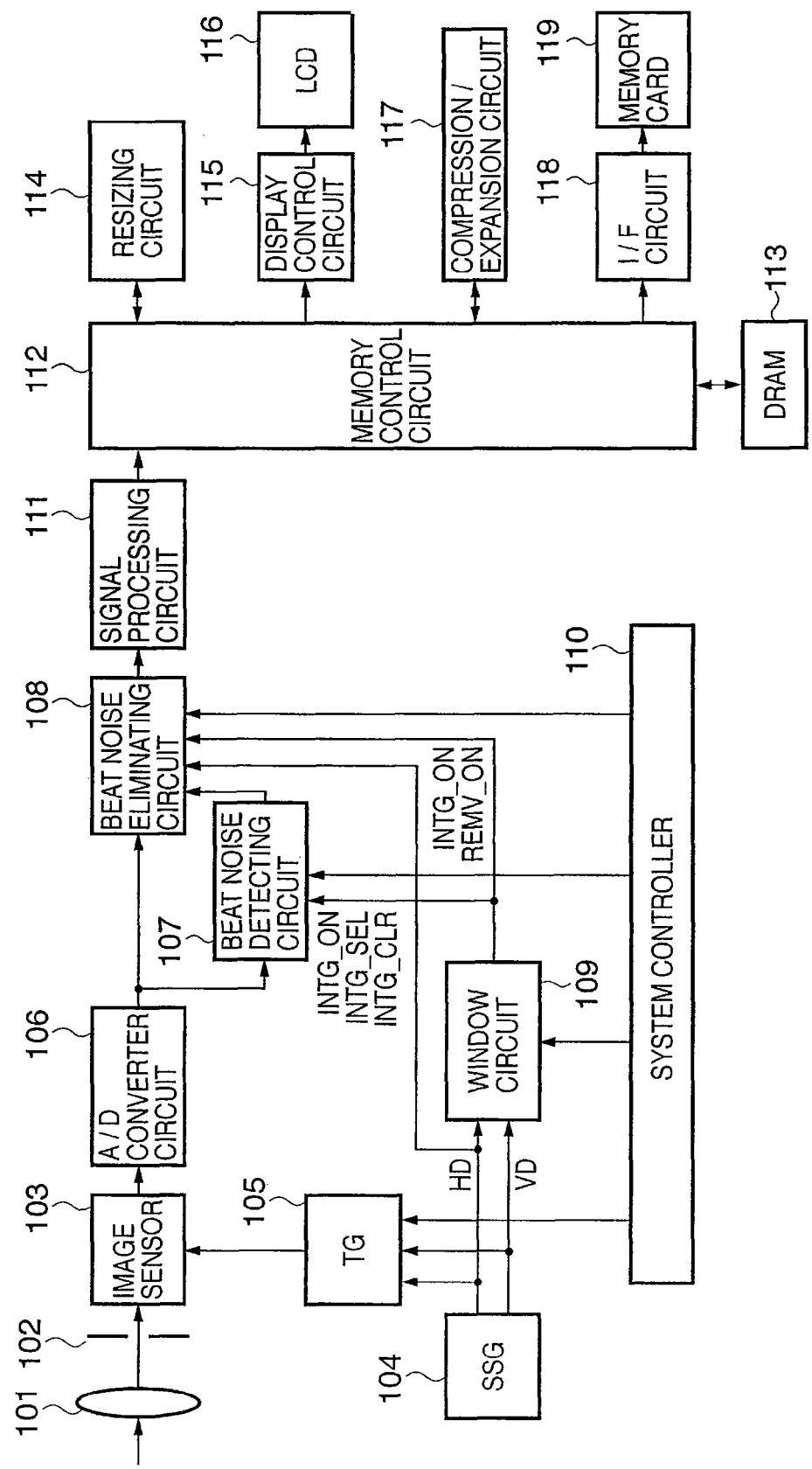
FIG. 1 is a functional block diagram of an image processing apparatus according to a first embodiment of the present invention.

FIG. 1 is a functional block diagram representing functions of an imaging apparatus that is an image processing apparatus according to a first embodiment of the present invention. The imaging apparatus according to the first embodiment is configured so that the cycle of a beat noise signal is an integral multiple of pixel data, and is configured to be able to eliminate beat noise signals while capturing images.

In FIG. 1, reference numeral 101 denotes an imaging lens, reference numeral 102 denotes an aperture mechanism, and reference numeral 103 denotes a semiconductor image sensor that photoelectrically converts optical signals. Solid state image sensors based on semiconductor technology, such as CCD image sensors or MOS image sensors, may be used as the image sensor 103. Reference numeral 104 denotes a synchronizing signal generator (hereinafter abbreviated as SSG) that generates a horizontal synchronizing signal HD (hereinafter referred to as HD signal) and a vertical synchronizing signal VD (hereinafter referred to as VD signal) having cycles of fixed values. Reference numeral 105 denotes a timing generator (hereinafter abbreviated as TG) that generates various control signals that are synchronized with HD and VD signals and which drive the image sensor 103.

In addition, reference numeral 106 denotes an A/D converter circuit that converts analog image signals to digital image data. Reference numeral 107 denotes a beat noise detecting circuit that calculates, from optical black pixel data, noise data corresponding to one cycle of the beat noise component included in image data outputted from the A/D converter circuit 106. Reference numeral 108 denotes a beat noise eliminating circuit that subtracts noise data corresponding to one beat noise cycle calculated by the beat noise detecting circuit 107 from effective pixel data.

Furthermore, reference numeral 109 denotes a window circuit that generates control signals that drive the beat noise detecting circuit 107 and the beat noise eliminating circuit 108. Reference numeral 110 denotes a system controller that determines modes and parameters of the respective circuits, while reference numeral 111 denotes a signal processing circuit that performs image processing such as interpolation and color conversion on image data.

Moreover, reference numeral 113 denotes a DRAM that temporarily stores signal-processed image data, reference numeral 112 denotes a memory control circuit that performs bus arbitration between the DRAM 113 and the respective circuits, and reference numeral 114 denotes a resizing circuit that enlarges or reduces image data. Reference numeral 116 is an LCD that is a display device for displaying image data, while reference numeral 115 is a display control circuit that enables image data to be displayed on the LCD 116.

Additionally, reference numeral 117 denotes a compression/expansion circuit that compresses and/or expands image data using a compression method such as the JPEG compression method. Reference numeral 119 is a detachable memory card for recording image data compressed by the compression/expansion circuit 117, and reference numeral 118 is an I/F circuit that interfaces with the memory card 119.

Next, a description will be given on imaging operations performed by the imaging apparatus according to the first embodiment of the present invention, which is configured as shown in FIG. 1. The TG 105 generates a control signal that drives the image sensor 103 from HD and VD signals generated by the SSG 104. The image sensor 103 converts an optical signal having passed through the lens 101 and the aperture 102 to an electric signal at the timing of a control signal supplied from the TG 105. An analog image signal read by the image sensor 103 is converted to digital image data by the A/D converter circuit 106, and outputted therefrom to the beat noise detecting circuit 107 and the beat noise eliminating circuit 108.

The window circuit 109 references the HD and VD signals, and supplies an enable signal INTG_ON, a select signal INTG_SEL and a reset signal INTG_CLR to the beat noise detecting circuit 107. In addition, the window circuit 109 supplies an enable signal REMV_ON and a reset signal INTG_ON to the beat noise eliminating circuit 108.

In accordance with a control signal supplied by the window circuit 109, the beat noise detecting circuit 107 calculates noise data of a number of pixels corresponding to one beat noise cycle. Next, at the beat noise eliminating circuit 108, the beat noise component is eliminated by subtracting from image data the noise data calculated by the beat noise detecting circuit 107.

Image data outputted by the beat noise eliminating circuit 108 and from which the beat noise component has been eliminated is signal-processed by the signal processing circuit 111, and stored in the DRAM 113 via the memory control circuit 112.

The resizing circuit 114 reads out image data stored in the DRAM 113, resizes the image data to a size of around 720× 480 pixels in order to have the image data displayed on the LCD 116, and displays the image data on the LCD 116 via the display control circuit 115. The compression/expansion circuit 117 compresses image data read out from the DRAM 113, and writes the compressed image data into the DRAM 113. The I/F circuit 118 further writes the compressed image data read out from the DRAM 113 into the memory card 119.

Figure 2:
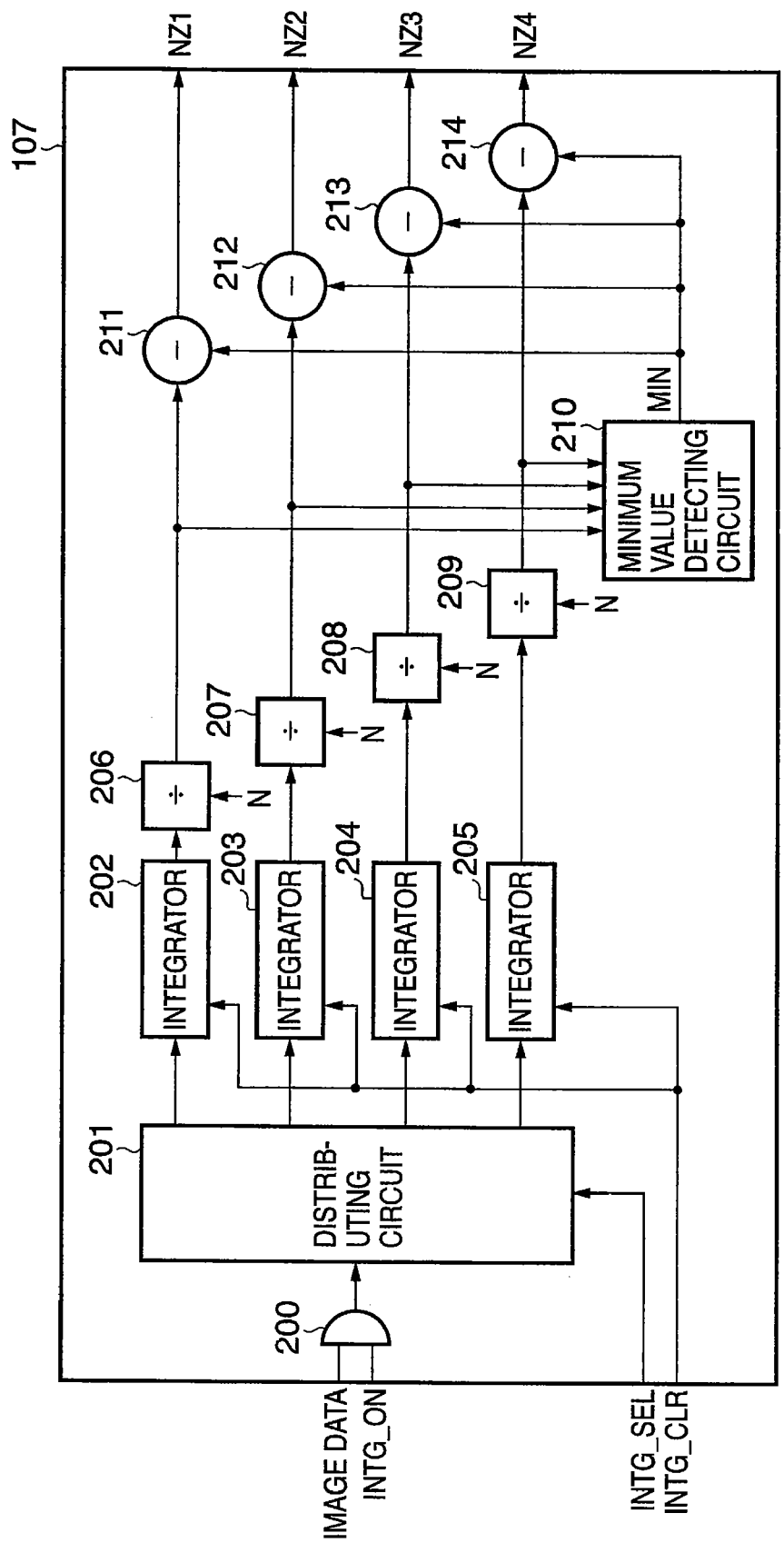
FIG. 2 is a functional block diagram of a beat noise detecting circuit according to the first embodiment of the present invention.

FIG. 2 shows a configuration of the beat noise detecting circuit 107 in a case where, for instance, the beat noise has a cycle of 4 pixels. The beat noise detecting circuit 107 comprises integrators 202 to 205. When the signal INTG_CLR from the window circuit 109 reaches a high level, the integral values of the integrators 202 to 205 will be reset.

Figure 3:
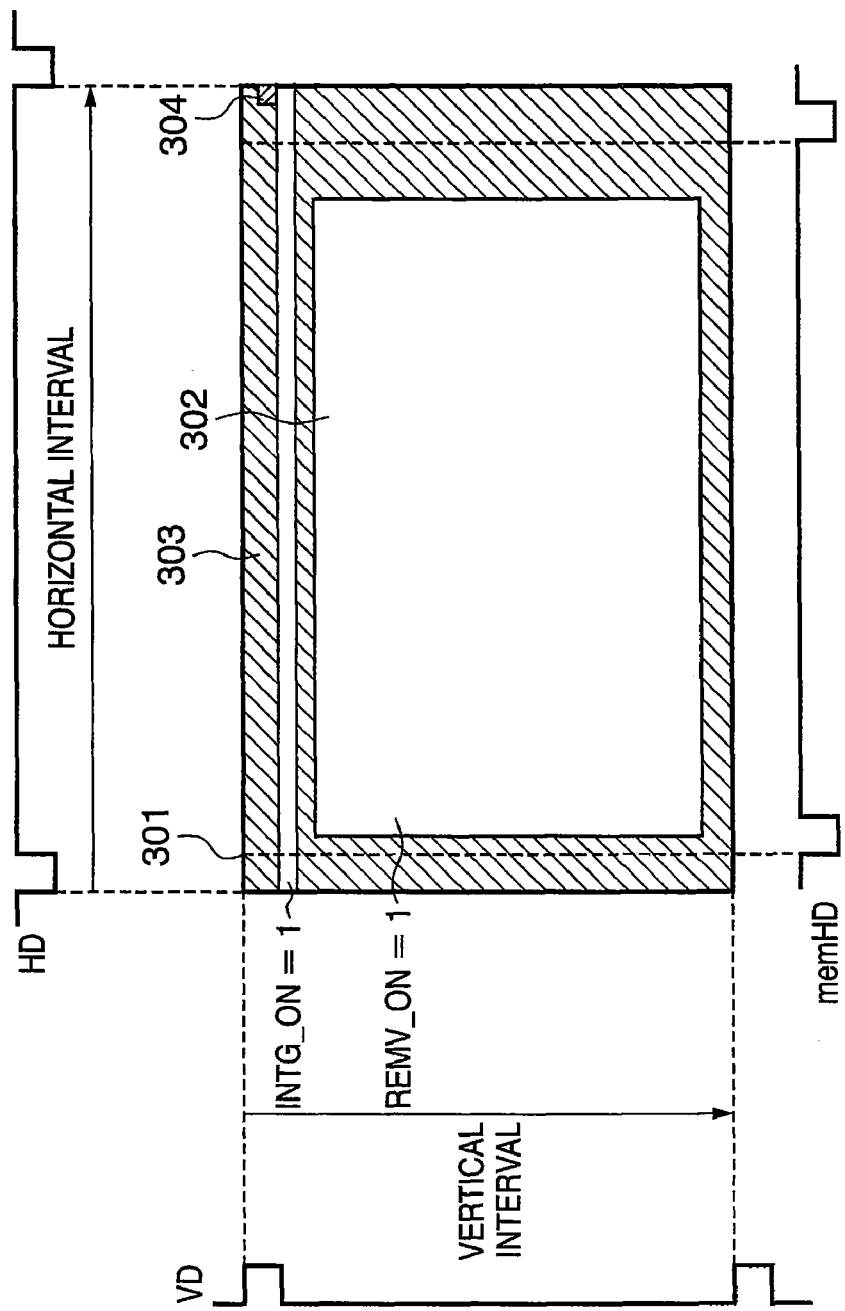
FIG. 3 is a diagram for explaining an optical black area, an effective pixel area and the like of an image processing apparatus according to the first embodiment of the present invention.

As shown in FIG. 3, the signal INTG_CLR reaches a high level at the position indicated by reference numeral 304, whereby reset operations of the integrators 202 to 205 are performed. From the pixel data next to the reset position 304 shown in FIG. 3 and onwards, the signal INTG_ON from the window circuit 109 will reach a high level. Therefore, at an AND circuit 200 shown in FIG. 2, image data outputted from the A/D converter circuit 106 is gated by the signal INTG_ON and sent to a distributing circuit 201.

As shown in FIG. 3, INTG_ON is a signal that reaches a high level during integration of optical black area pixel data contained in a single horizontal interval included in an optical black area 303 by any of the integrators 202 to 205 of the beat noise detecting circuit 107.

The distributing circuit 201 distributes image data gated by the signal INTG_ON to any of the integrators 202, 203, 204 and 205 in accordance with the value of an INTG_SEL signal outputted by the window circuit 109.

As shown in FIG. 3, INTG_SEL is a signal that cyclically repeats selection of supplied image data on a per-pixel basis within the range of the number of pixels in a beat noise cycle when the signal INTG_ON is at a high level or, in other words, when the value thereof is "1".

In the present first embodiment, since it is assumed that beat noise has a cycle of 4 pixels, the signal INTG_SEL recurs as: 0, 1, 2, 3, 0, . . . . In this case, the distributing circuit 201 repeatedly switches the respective distribution output destinations of the optical black area pixel data to the integrator 202, the integrator 203, the integrator 204, the integrator 205, the integrator 202, and so on. Through such operations, the integrators 202 to 205 integrate optical black area pixel data corresponding to one horizontal interval that is supplied in this manner.

The number of integrators provided in the beat noise detecting circuit 107 is determined by the number of pixels in a beat noise cycle. In the present first embodiment, since beat noise has a cycle of 4 pixels, four integrators 202 to 205 are provided. It is needless to say that even cases where the beat noise cycle is less than 4 pixels may be accommodated by varying the cycle of the signal INTG_SEL in accordance with the beat noise cycle. For instance, if beat noise has a cycle of 3 pixels, changing the signal INTG_SEL as 0, 1, 2, 0, 1, 2, . . . shall suffice. In addition, cases where the beat noise cycle is greater than 4 pixels may be accommodated by increasing the numbers of integrators in accordance with the beat noise cycle.

Figure 4:
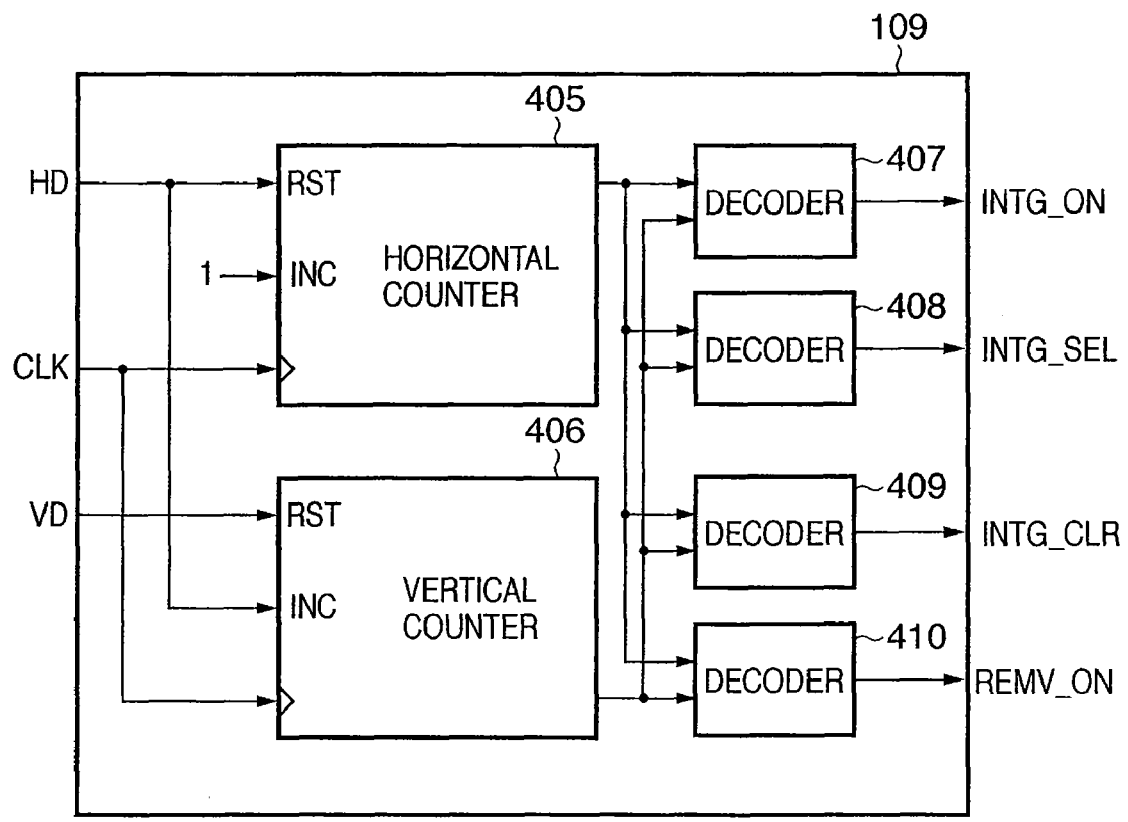
FIG. 4 is a functional block diagram of a window circuit used in an image processing apparatus according to the first embodiment of the present invention.

Furthermore, as shown in FIG. 4, the signals INTG_ON, INTG_SEL and INTG_CLR are generated by decoding outputs of a horizontal counter 405 and a vertical counter 406 provided in the window circuit 109 using decoders 407 to 410.

The integration results of the integrator 202 are divided by N by a divider 206. The value of N is determined so as to normalize a value integrated by the integrator, and is specified by the system controller 110 shown in FIG. 1. In a similar manner, integration results of the integrators 203, 204 and 205 are respectively divided by N by dividers 207, 208 and 209 to be normalized to per-pixel signal levels.

Next, at a minimum value detecting unit 210, a minimum value MIN is detected from data normalized by the dividers 206 to 209. Direct current (DC) components of beat noise are removed at subtracters 211 to 214 by respectively subtracting the minimum value MIN from normalized data from the dividers 206 to 209. Using the above method, unit of noise data NZ1, NZ2, NZ3 and NZ4, which are pixel values corresponding to a single beat noise cycle, are generated.

A correction method performed by the beat noise eliminating circuit 108 will now be described with reference to FIG. 5. A selector 501 selects noise data NZ1, NZ2, NZ3 and NZ4 generated by the beat noise detecting circuit 107 in accordance with an output D that is a selection control signal, which will be described later. A subtracter 507 subtracts noise data selected by the selector 501 from effective pixel data supplied from the A/D converter circuit 106. A selector 513 further selects an output of the subtracter 507 when the signal REMV_ON that is outputted from the window circuit 109 is at a high level, and outputs the same as corrected image data. However, when the signal REMV_ON is at a low level, pixel data supplied from the A/D converter circuit 106 is selected and outputted without modification.

REMV_ON is a signal that reaches a high level when an effective pixel signal of an effective pixel area 302 is being sent from the A/D converter circuit 106 to the beat noise eliminating circuit 108. As shown in FIG. 4, the signal REMV_ON is generated by decoding outputs of the horizontal counter 405 and the vertical counter 406 provided in the window circuit 109 using the decoder 410.

A method of generating selection control signals by the selector 501 will now be described with reference to the block diagram shown in FIG. 5 and the time chart shown in FIG. 6. When the signal REMV_ON reaches a high level, the reset of a pixel counter 502 is released as shown in FIG. 6, and the pixel counter 502 executes counting of a single horizontal interval by counting up in accordance with a clock. The count value of the pixel counter 502 is sent to an adder 512. The adder 512 adds the count value of the pixel counter 502 and a signal initial_phase. As shown in FIG. 6, the signal initial_phase is either a number of pixels from the start of an HD signal to the start of the signal REMV_ON or a remainder of the number of pixels divided by the beat noise cycle, and is set by the system controller 110. A result of addition by the adder 512 is illustrated in FIG. 6 as output B. In the diagram, the value of the signal initial_phase has been set to 2.

At a horizontal interval counter 503, a count value thereof is reset when the signal INTG_ON sent from the window circuit 109 is at a high level, and, as shown in FIG. 6, a count operation is executed in accordance with the HD signal when the signal INTG_ON is at a low level. In other words, at the horizontal interval counter 503, count operation is performed using as reference a horizontal interval in which noise data NZ1 to NZ4 is calculated by the beat noise detecting circuit 107 from optical black area pixel data corresponding to one horizontal pixel.

As shown in FIG. 6, a signal "phase" is a signal of a beat noise phase difference per horizontal interval, and is sent from the system controller 110. The signal "phase" and an output value of the horizontal interval counter 503 are multiplied by a multiplier 504. A result of multiplication of the multiplier 504 is illustrated in FIG. 6 as output A. In this diagram, the value of the signal "phase" is set to 1. The multiplication result from the multiplier 504 and the addition result from the adder 512 are added by an adder 505. A result of addition by the adder 505 is illustrated in FIG. 6 as output C.

A remainder calculator 506 sends a remainder of a division of the addition result from the adder 505 by 4, which is the number of pixels of a single beat noise cycle, as a selection control signal to the selector 501. A result of remainder calculation by the remainder calculator 506 is illustrated in FIG. 6 as output D. Output D, which is a selection control signal, is equal to the beat noise phase value shown in FIG. 6 during a high level interval of the signal REMV_ON. Noise data is selected by the selector 501 in accordance with the phase of the beat noise. The value of the number of pixels of a single beat noise cycle used by the remainder calculator 506 is specified by the system controller 110.

Figure 7:
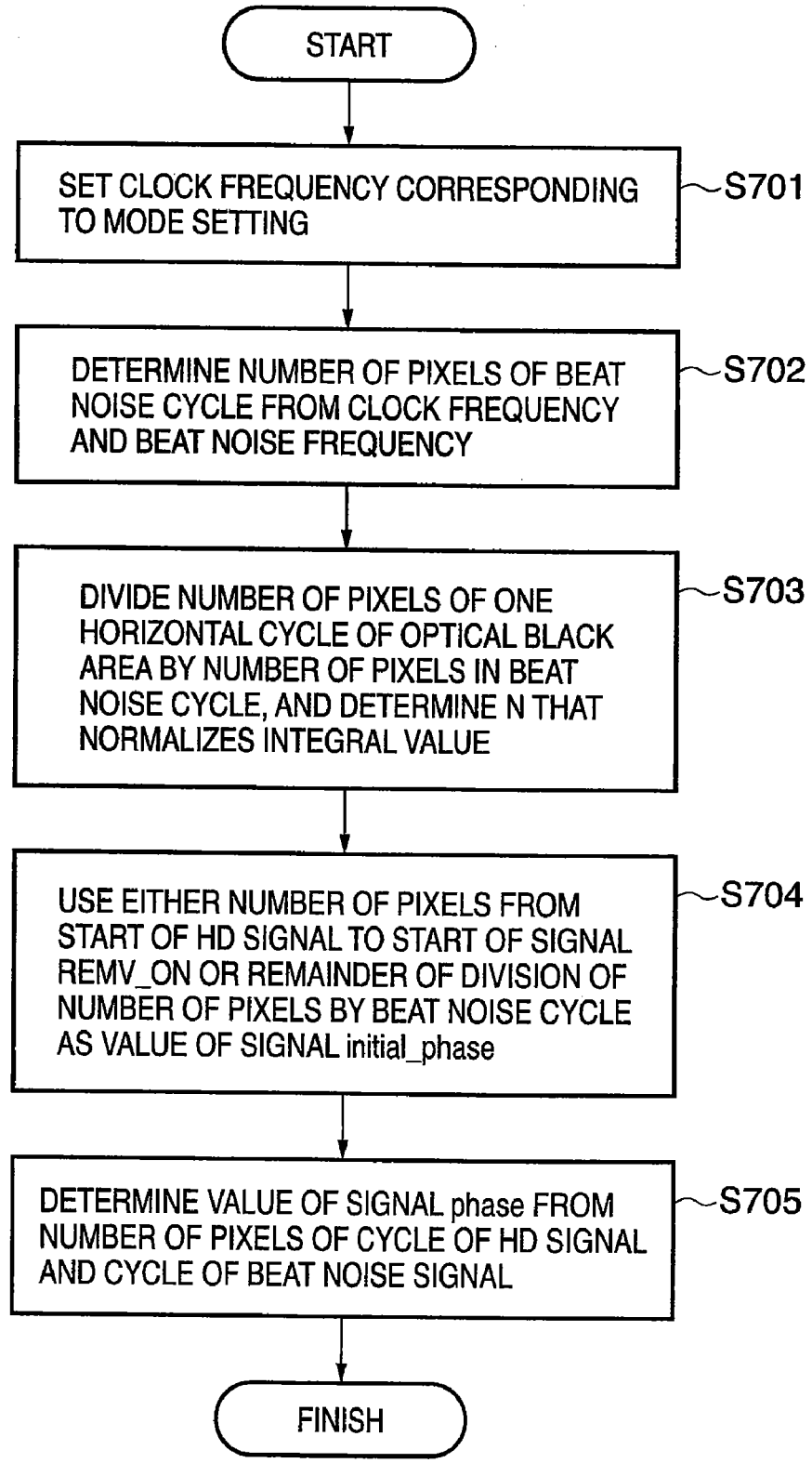
FIG. 7 is a flowchart for explaining operations of a system controller of an image processing apparatus according to the first embodiment of the present invention.
Figure 8:
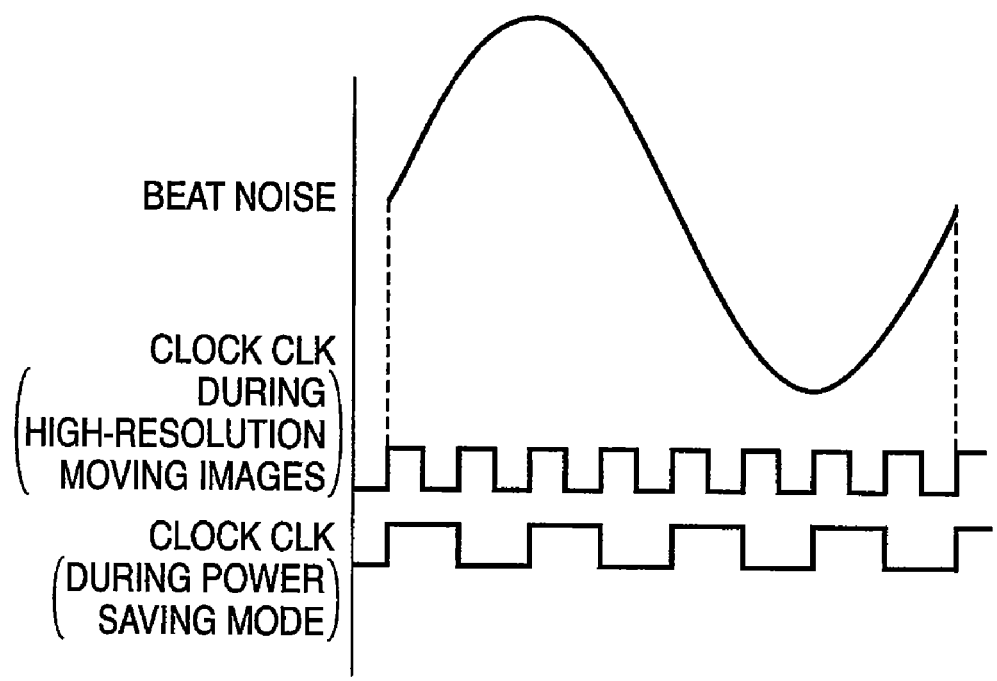
FIG. 8 is a diagram for explaining changes in beat noise frequency with respect to modes of an image processing apparatus according to the first embodiment of the present invention.

The system controller 110 operates as depicted by the flow chart shown in FIG. 7. In FIG. 7, a clock frequency is set according to mode in step S701. More specifically, a signal is sent from the system controller 110 to the TG 105 in accordance with the operating mode of the imaging apparatus, such as a mode for photographing high resolution moving images or a power saving mode of the electronic view finder, thereby changing the clock frequency of the image sensor. In this case, as shown in FIG. 8, since the surrounding clock frequency is constant, the cycle of beat noise remains unchanged while the number of pixels per cycle changes. Next, in step S702, the clock frequency of the image sensor 103 is divided by the beat noise frequency to calculate a number of pixels per beat noise cycle. The number of pixels is set to the remainder calculator 506 of the beat noise eliminating circuit 108. Proceeding now to step S703, the number of pixels corresponding to a single horizontal period in an optical black area is divided by the number of pixels per beat noise cycle to determine a value N that normalizes the respective integrated values of the integrators 202 to 205. This value N is set to the beat noise detecting circuit 107.

Next, in step S704, a value of the signal initial_phase is determined. In this case, as shown in FIG. 6, either a number of pixels from the start of an HD signal to the start of the signal REMV_ON or a remainder of the number of pixels divided by the beat noise cycle is set as the value of the signal initial_phase to the beat noise eliminating circuit 108. Furthermore, a value of the signal "phase" is determined in step S705 by setting the remainder value of a division of the clock frequency of a cycle of the HD signal by the number of pixels in a beat noise cycle, and is set to the beat noise eliminating circuit 108.

Second Embodiment

Figure 9:
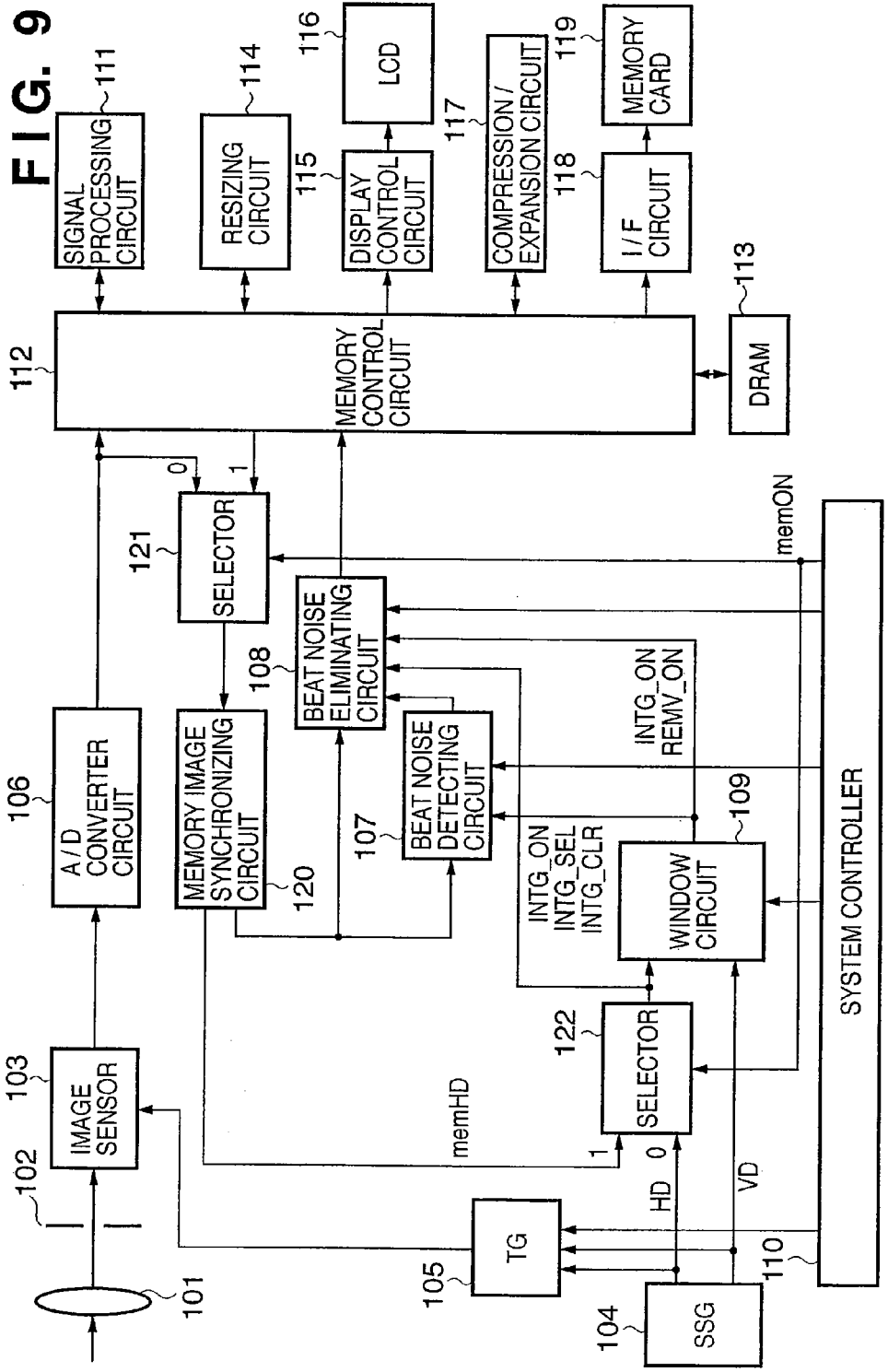
FIG. 9 is a functional block diagram of an image processing apparatus according to a second embodiment of the present invention.

FIG. 9 is a functional block diagram representing functions of an imaging apparatus that is an image processing apparatus according to a second embodiment of the present invention. The imaging apparatus according to the present second embodiment is configured so that a cycle of a beat noise signal is an integral multiple of a pixel data cycle, and is configured to be able to eliminate beat noise signals by reading out image data from the DRAM 113.

The imaging apparatus according to the present second embodiment is configured so as to be selectable, by means of a signal outputted by the system controller 110, between beat noise elimination during reading of image data and beat noise elimination on image data read out from the DRAM 113. In addition, even if the beat noise cycle is unknown, beat noise correction may be performed after determining the beat noise cycle by analyzing, through Fast Fourier Transform or the like, an optical black area of read-in image data that is temporarily stored in the memory.

In FIG. 9, like elements to FIG. 1 are represented by like reference characters. Thus, unless particularly noted, the same operations as illustrated in FIG. 1 will be performed. In FIG. 9, image data for which a signal has been read out by the image sensor 103 in accordance with a clock that is synchronized to the HD and VD signals is stored in the DRAM 113 by the memory control circuit 112 via the A/D converter circuit 106.

A signal memON that is outputted from the system controller 110 reaches a high level when beat noise elimination is performed on image data read out from the DRAM 113, and drops to a low level when performing beat noise elimination during capturing. In the present second embodiment, the signal memON reaches a high level, and image data read out from the DRAM 113 by the selector 121 via the memory control circuit 112 is outputted to a memory image synchronizing circuit 120. The memory image synchronizing circuit 120 generates and outputs a signal memHD for which one pulse is generated every horizontal interval of the image data read out from the DRAM 113 by the memory control circuit 112.

Image data read out from the DRAM 113 is the area denoted by reference numeral 307 in FIG. 3, and is asynchronous with the HD signal. Therefore, there is a need to newly generate a signal memHD corresponding to the image data read out from the DRAM 113. In addition, since image data is read out from the DRAM 113 on a per-frame unit basis, there is no need to newly generate a VD signal. At the same time, the memory image synchronizing circuit 120 outputs the image data read out from the DRAM 113 to the beat noise detecting circuit 107 and the beat noise eliminating circuit 108.

A selector 122 selects the signal memHD if the signal memON is at a high level, and selects the HD signal if the signal memON is at a low level. In the present second embodiment, since the signal memON is at a high level, the signal memHD is outputted to the window circuit 109. The window circuit 109 decodes the signal memHD to generate signals INTG_ON, INTG_SEL, INTG_CLR and REMV_ON, and outputs these signals to the beat noise detecting circuit 107 and the beat noise eliminating circuit 108.

Beat noise is eliminated by the beat noise detecting circuit 107 and the beat noise eliminating circuit 108 according to the signals INTG_ON, INTG_SEL, INTG_CLR and REMV_ON, and the result thereof is stored in the DRAM 113 by the memory control circuit 112. Image data stored in the DRAM 113 and from which the beat noise component has been eliminated is signal-processed by the signal processing circuit 111, and stored in the DRAM 113 via the memory control circuit 112.

The resizing circuit 114 reads out-image data stored in the DRAM 113, resizes the image data to a size that enables display on the LCD 116, and displays the image data on the LCD 116 via the display control circuit 115. In addition, the compression/expansion circuit 117 compresses the image data read out from the DRAM 113, and writes the compressed image data into the memory card 119 via the I/F circuit 118.

Next, a method of beat noise correction according to the second embodiment will be described. The configuration and operations of the beat noise detecting circuit 107 according to the second embodiment are similar to those of the first embodiment 1, and shares the arrangement shown in FIG. 2. However, as for the method of selecting noise data NZ1 to NZ4 corresponding to image data read out from the DRAM 113 which is performed by the beat noise eliminating circuit 108, such selection must be made in accordance with the scanning method of the used image sensor 103.

A description will now be given on image data that is captured by the image sensor 103 that uses a scanning method in which a sensor such as a progressive scanning CCD performs sequential read on a per-horizontal interval basis and which is stored in the DRAM 113. More specifically, in this case, as indicated by the beat noise phase of the first pixel of the HD signal interval shown in FIG. 6, the beat noise phase per horizontal period changes such that values of the signal "phase" advances by three values per progress of a single horizontal interval. As seen, the beat noise phase per horizontal period changes at a constant rate due to its dependence on the constant cycle of the HD signal. Thus, in the same manner as the first embodiment in which noise elimination is performed while acquiring image data, selecting noise data in the configuration of the beat noise eliminating circuit 108 shown in FIG. 5 may suffice.

Figure 11:
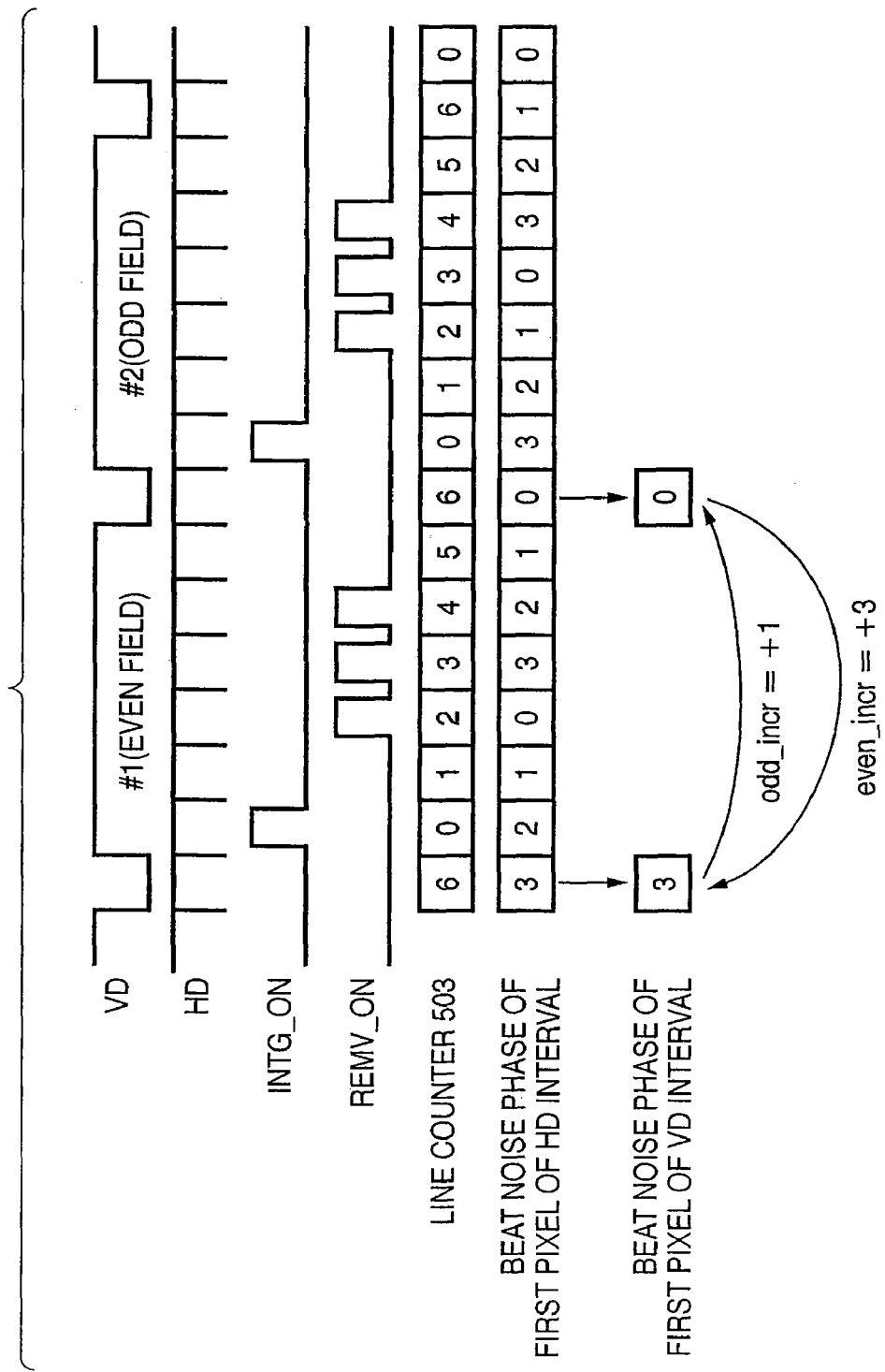
FIG. 11 is a diagram for explaining per-field phase differences according to the second embodiment of the present invention.

A description will now be given on image data that is captured by a sensor such as an interlace scanning CCD of the image sensor 103, which uses a 2-field scanning method, and which is stored in the DRAM 113. In this case, the changes in phase of the respective horizontal intervals in a single field are constant as shown in FIG. 6. However, as indicated by the beat noise phase of the first pixel of the VD signal interval shown in FIG. 11, since a beat noise phase difference exists in each field, selection of noise data with respect to image data containing beat noise components must be performed using the method described below.

Figure 10:
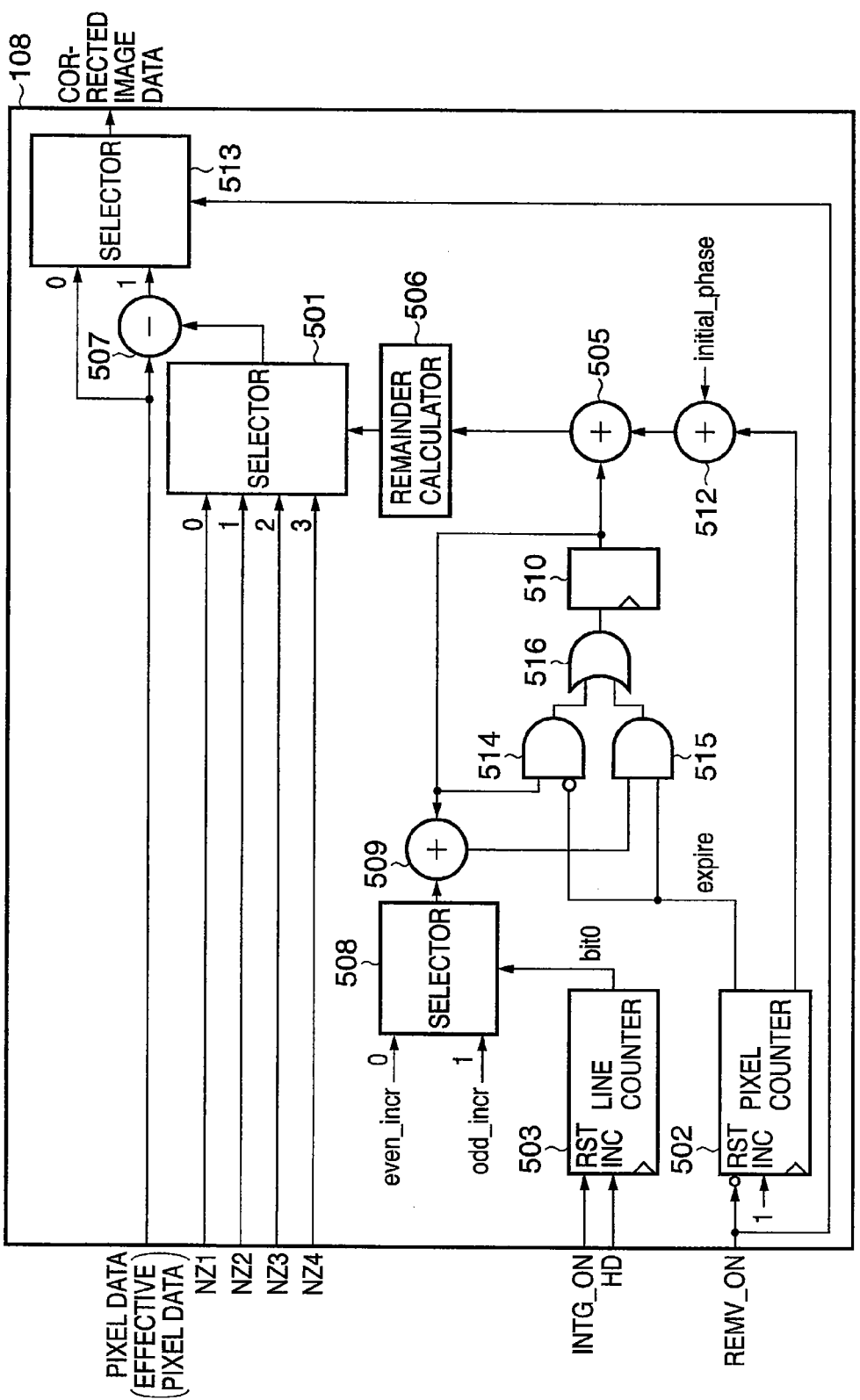
FIG. 10 is a functional block diagram of a beat noise eliminating circuit according to the second embodiment of the present invention.

FIG. 10 is a circuit diagram of the beat noise eliminating circuit 108 according to the second embodiment. In FIG. 10, like elements to FIG. 5 are represented by like reference characters. Thus, unless particularly noted, the same operations as illustrated in FIG. 5 will be performed. A description will now be given on a case where an image scanned at every other horizontal interval using an interlace scanning CCD is read out from the DRAM 113.

Even_incr shown in FIG. 10 is a signal of a phase difference of an even number horizontal interval with respect to an odd number horizontal interval, while odd_incr is a signal of a phase difference of an odd number horizontal interval with respect to an even number horizontal interval. The signals even_incr and odd_incr are set by the system controller 110.

Since an LSB of the horizontal interval counter 503 of 0 indicates that an even number horizontal interval of image data is being processed, the signal even_incr is selected by a selector 508. On the other hand, since an LSB of the horizontal interval counter 503 of 1 indicates that an odd number horizontal interval of image data is being processed, the signal odd_incr is selected.

An adder 509 adds output of the selector 508 to the phase of the immediately previous horizontal interval. The addition result of the adder 509 is loaded to a flip-flop 510 at a timing whereat the counter value of the pixel counter 502 matches the number of pixels of a single horizontal interval specified by the system controller 110. To this end, AND circuits 514, 515 and an OR circuit 516 are provided. On the other hand, for intervals where the counter value of the pixel counter 502 does not match the number of pixels of a single horizontal interval, the value of the flip-flop 510 is retained without modification.

An adder 512 adds the count value of the pixel counter 502 and a signal initial_phase. The value of the signal initial_phase is equivalent to the number of pixels from the signal memHD to a high level of the signal REMV_ON.

The adder 505 adds the beat noise phase value held by the flip-flop 510 to the output of the adder 512. The remainder calculator 506 outputs a remainder value of a division of the addition result of the adder 505 by 4, which is the number of pixels of a single beat noise cycle, as a selection control signal to the selector 501. The value of the number of pixels of a single beat noise cycle used by the remainder calculator 506 is specified by the system controller 110.

The selector 501 selects noise data in accordance with the selection control signal, and noise data is subtracted from the image data by the subtracter 507. When the signal REMV_ON is at a high level, the selector 513 selects an output of the subtracter 507, and outputs the same as corrected image data. When the signal REMV_ON is at a low level, image data inputted from the A/D converter circuit 106 is selected and outputted without modification.

While a case where a two field read type image sensor has been described with reference to FIG. 10, the present invention is capable of handling cases where image sensors that read three or more fields are used. A case will now be described in which the number of fields is set to X.

Figure 12:
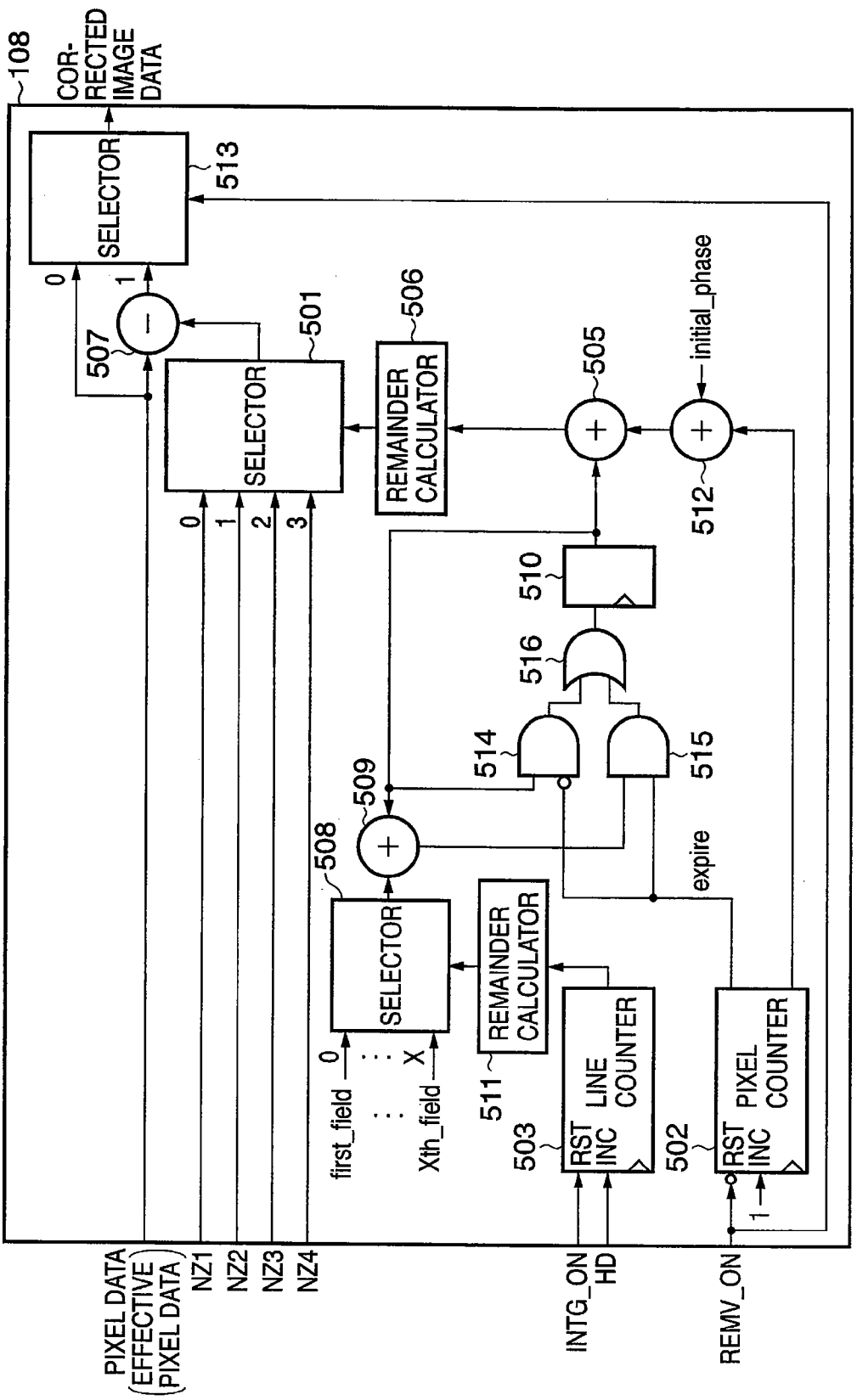
FIG. 12 is a functional block diagram of a beat noise eliminating circuit according to the second embodiment of the present invention.

As shown in FIG. 12, the same number of units of phase difference data of fields in the selector 508 as the number of fields X is prepared. In addition, inputting the results of a remainder calculation by the remainder calculator 511 of the counter value of the horizontal interval counter 503 by the number of fields X as selection control signals of the selector 508 may suffice.

Figure 5:
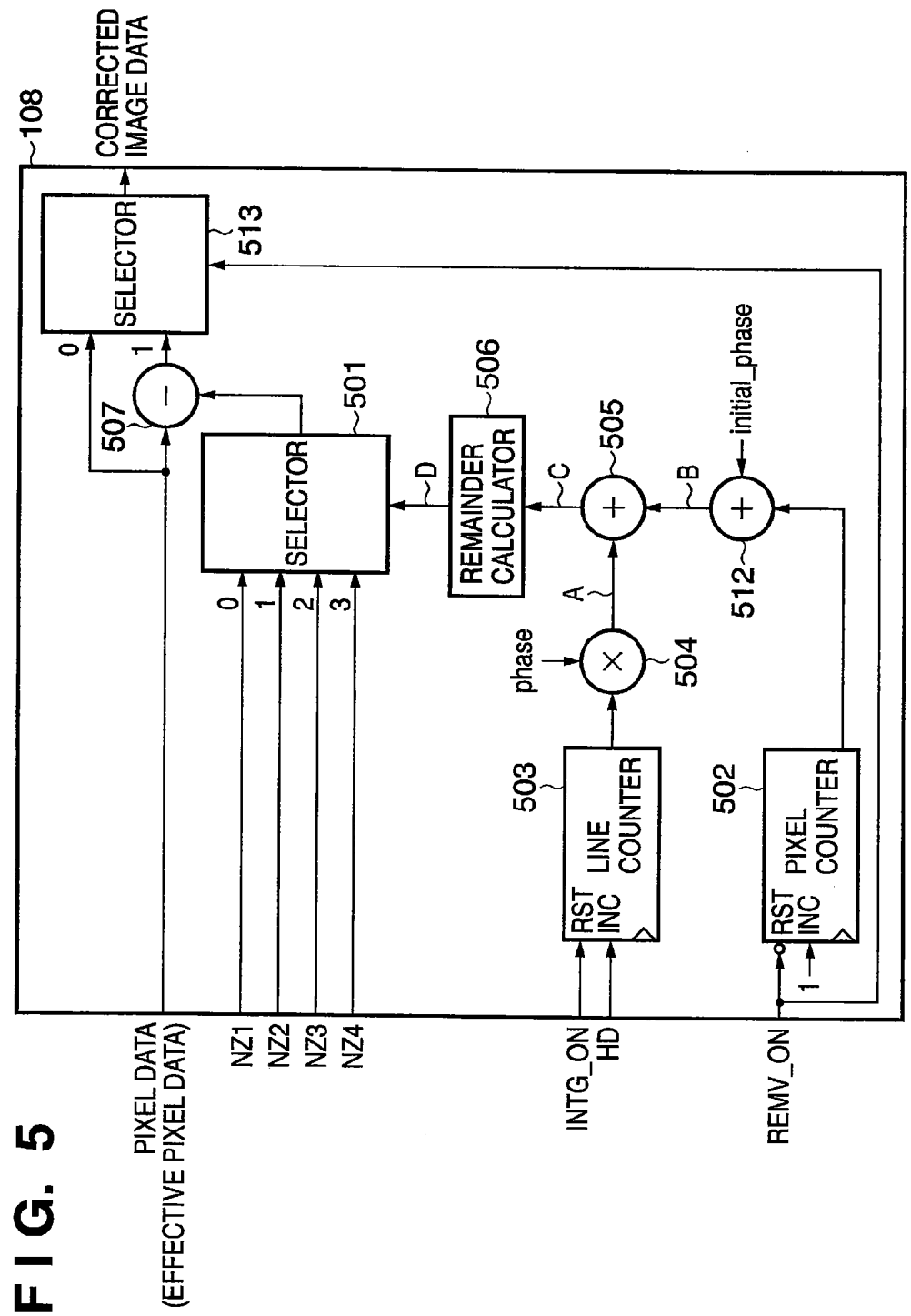
FIG. 5 is a functional block diagram of a beat noise eliminating circuit according to the first embodiment of the present invention.
Figure 6:
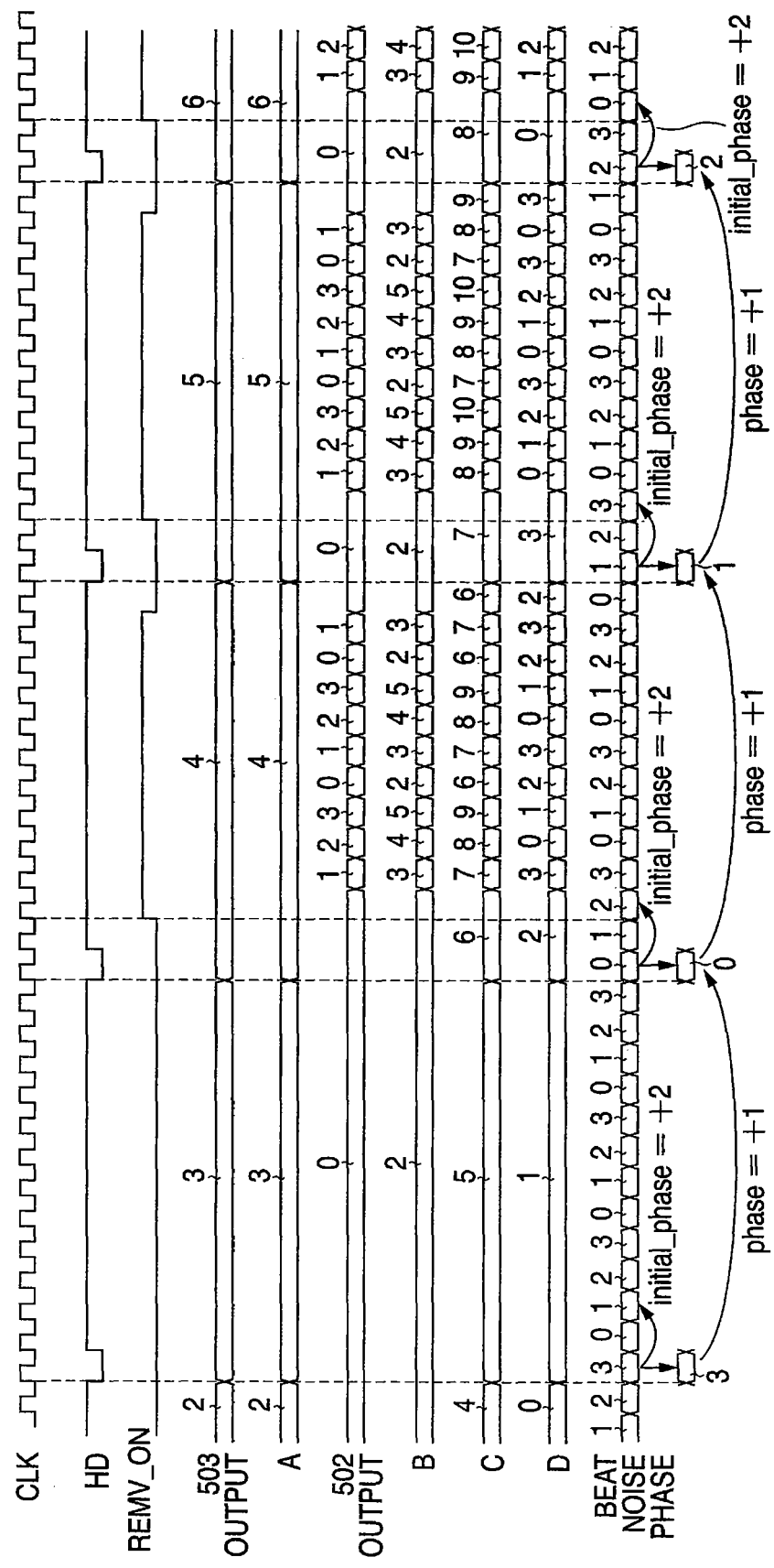
FIG. 6 is a time chart for explaining operations of an image processing apparatus according to the first embodiment of the present invention.

When generating a selection signal of the selector 501 that selects noise data such as those shown in FIGS. 5, 10 and 12, the adder 512 that adds an initial_phase to the pixel counter 502 and the multiplier 504 that multiplies the horizontal interval counter 503 by a "phase" are provided. This enables identification of the number of pixels by which beat noise deviates per horizontal interval, and therefore enables beat noise elimination to be performed even on data read out from the memory.

Furthermore, the present embodiment is arranged so that beat noise elimination may be performed on data read out from the memory. Therefore, as described above, even if the beat noise cycle is unknown, beat noise correction may be performed after determining the beat noise cycle by analyzing, by means of Fast Fourier Transform or the like, an optical black area of image data read out from the memory.

Third Embodiment

In a third embodiment of the present invention, the beat noise cycle is not an integral multiple of a pixel, and beat noise elimination is performed while acquiring image data. The third embodiment differs from the first in that the beat noise cycle is not an integral multiple of pixel data. A description on portions that differ from the first embodiment will be provided below.

Circuit configurations and operations of the beat noise detecting circuit 107 and the beat noise eliminating circuit 108 according to the third embodiment will now be described with reference to FIGS. 13A to 13C, 14 and 15.

Figure 13A:
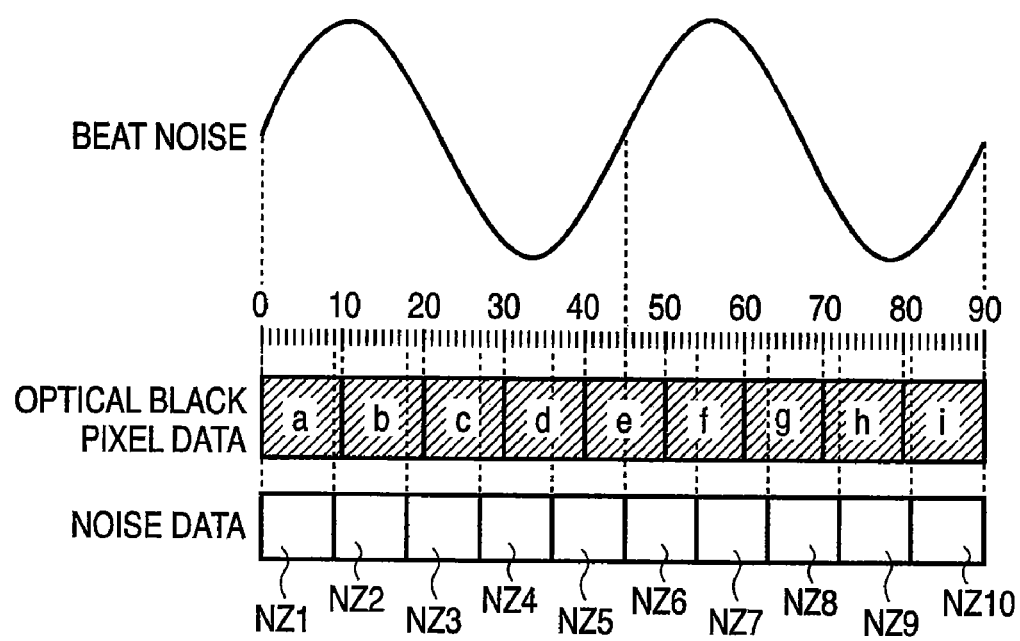
Figure 14:
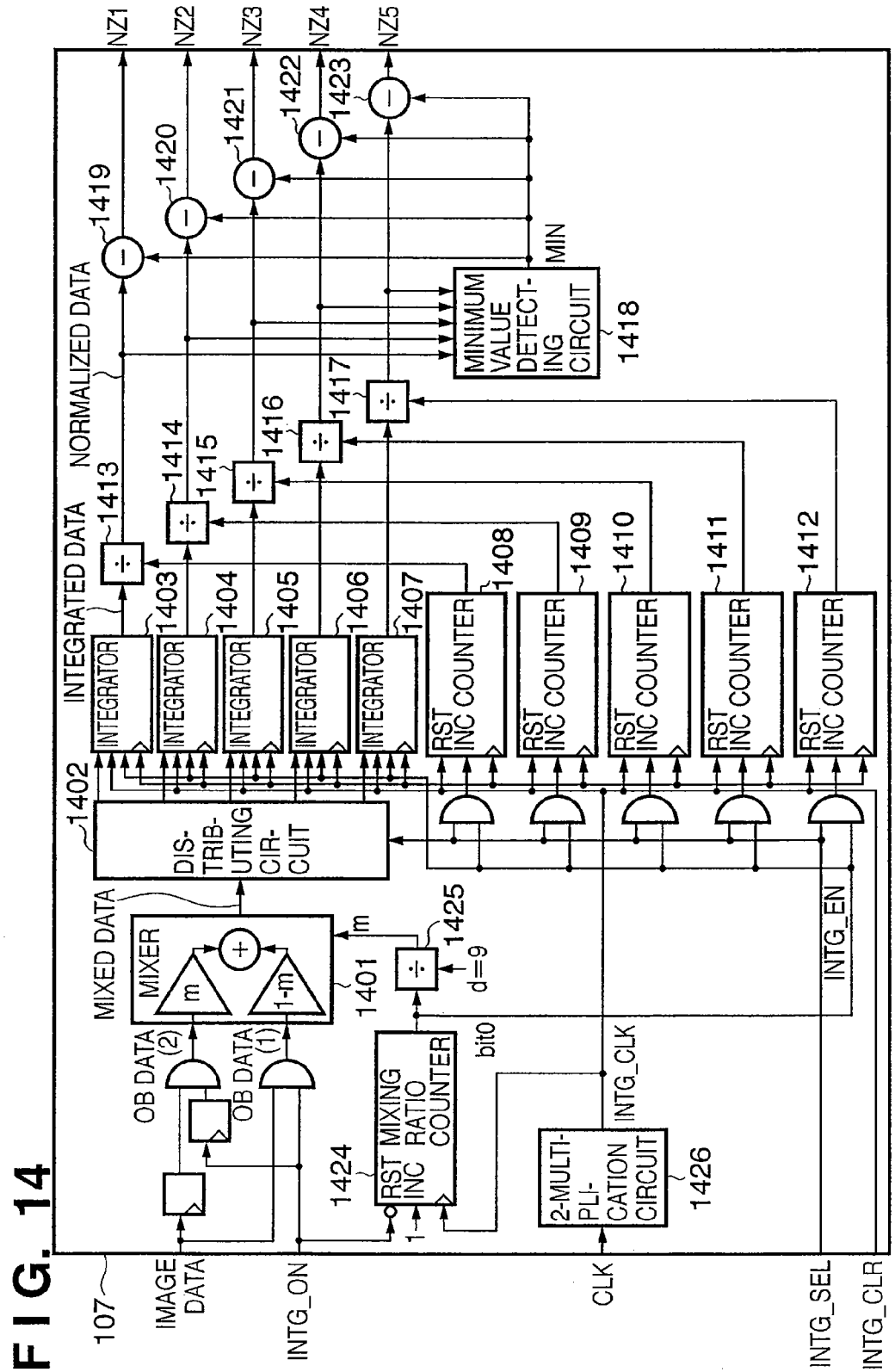
FIG. 14 is a functional block diagram of a beat noise detecting circuit according to a third embodiment of the present invention.
Figure 15:
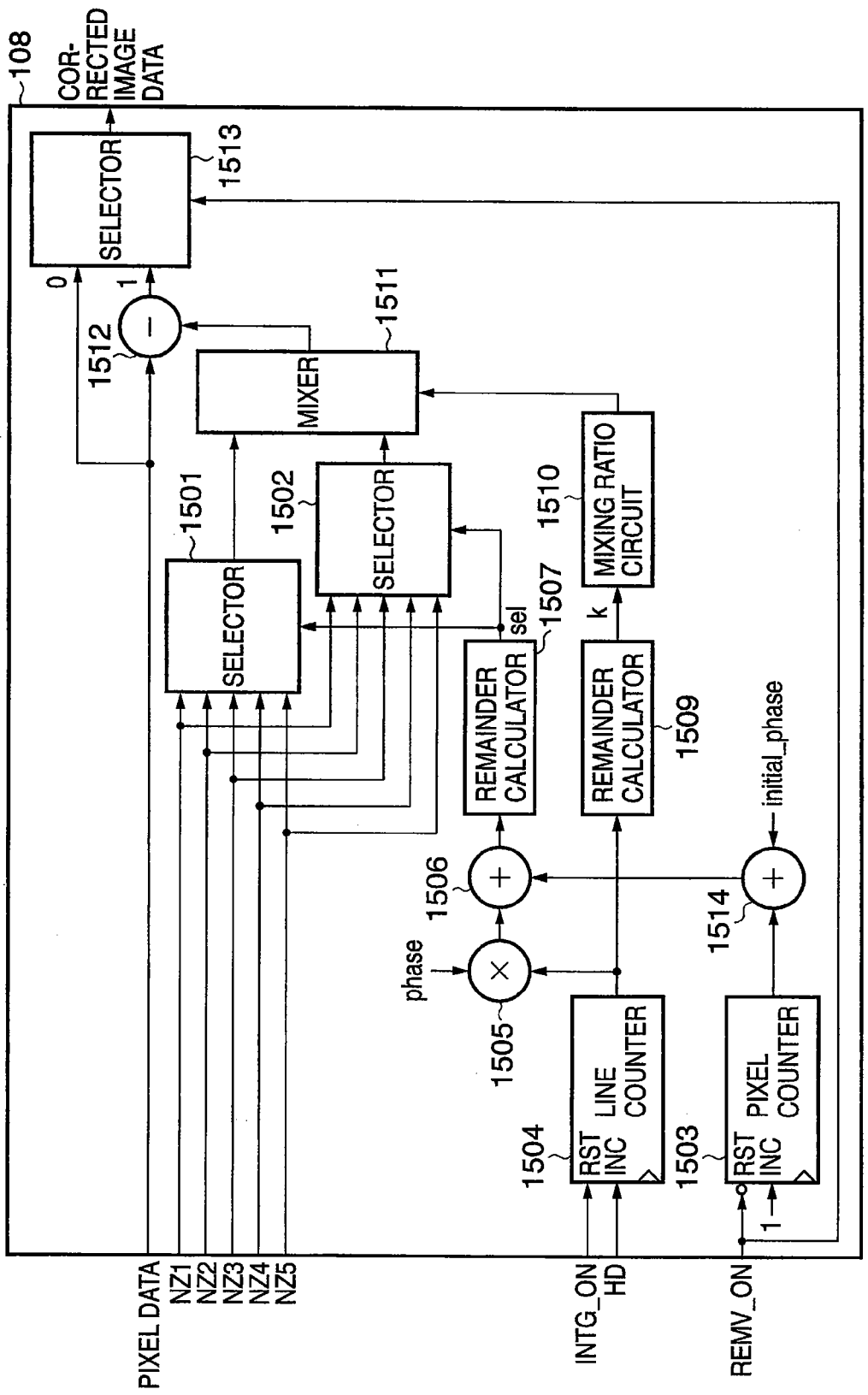
FIG. 15 is a functional block diagram of a beat noise eliminating circuit according to the third embodiment of the present invention.

FIGS. 13A to 13C are diagrams explaining, in a case where the beat noise cycle is 4.5 pixels, a method of converting 4.5 pixels of optical black pixel data into 5 pixels of noise data that is further used to obtain corrected image data. FIG. 14 is a circuit diagram of the beat noise detecting circuit 107 according to the third embodiment, and FIG. 15 is a circuit diagram of the beat noise eliminating circuit 108 according to the third embodiment.

Incidentally, even when the beat noise has a cycle other than 4.5 pixels, determining one beat noise cycle's worth of data by performing conversion into an integral number of units of data may suffice, where the integral number is equal to or greater than a pixel-unit expression of the beat noise cycle which is rounded to the nearest whole integer.

First, conversion is performed from 4.5 pixels of optical black pixel data included in one beat noise cycle into 5 pixels of noise data. As shown in FIG. 13A, the phases of optical black pixel data and noise data match each other once every two beat noise cycles.

FIG. 13B is a diagram that conceptualizes the sizes of pixels in noise data and which explains a method of calculating noise data, correction values and corrected image data. As shown in FIG. 13B, if the conceptual size of one noise data pixel is equivalent to 0.9 pixels of optical black pixel data, 4.5 pixels of a beat noise cycle may be expressed as 5 pixels of noise data. After weighting and mixing optical black pixel data as represented by the following equations, 10 patterns of values of mixed data MD are respectively determined.

Mixed data $MD1 = 9/9 \times$ optical black data $a$

Mixed data $MD2 = 1/9 \times$ optical black data $a + 8/9 \times$ optical black data $b$ Mixed data $MD3 = 2/9 \times$ optical black data $b + 7/9 \times$ optical black data $c$ Mixed data $MD4 = 3/9 \times$ optical black data $c + 6/9 \times$ optical black data $d$ Mixed data $MD5 = 4/9 \times$ optical black data $d + 5/9 \times$ optical black data $e$ Mixed data $MD6 = 5/9 \times$ optical black data $e + 4/9 \times$ optical black data $f$ Mixed data $MD7 = 6/9 \times$ optical black data $f + 3/9 \times$ optical black data $g$ Mixed data $MD8 = 7/9 \times$ optical black data $g + 2/9 \times$ optical black data $h$ Mixed data $MD9=8/9\times$optical black data $h+1/9\times$optical black data $i$ Mixed data $MD10=9/9\times$optical black data $i$ Operations of the beat noise detecting circuit 107 for calculating mixed data MD1 to MD 10 will now be described with reference to FIGS. 14 and 16. In FIG. 14, a mixer 1401, a mixing ratio counter 1424, a distributing circuit 1402, integrators 1403 to 1407, and counters 1408 to 1412 are operated by a signal INTG_CLK obtained by doubling the rate of CLK at a 2-multiplication circuit 1426.

This is due to the fact that, since the number of pixels of noise data per beat noise cycle becomes greater than the number of pixels of optical black pixel data per beat noise cycle, the above-described circuits must operate faster than the inputted optical black pixel data.

Figure 16A:
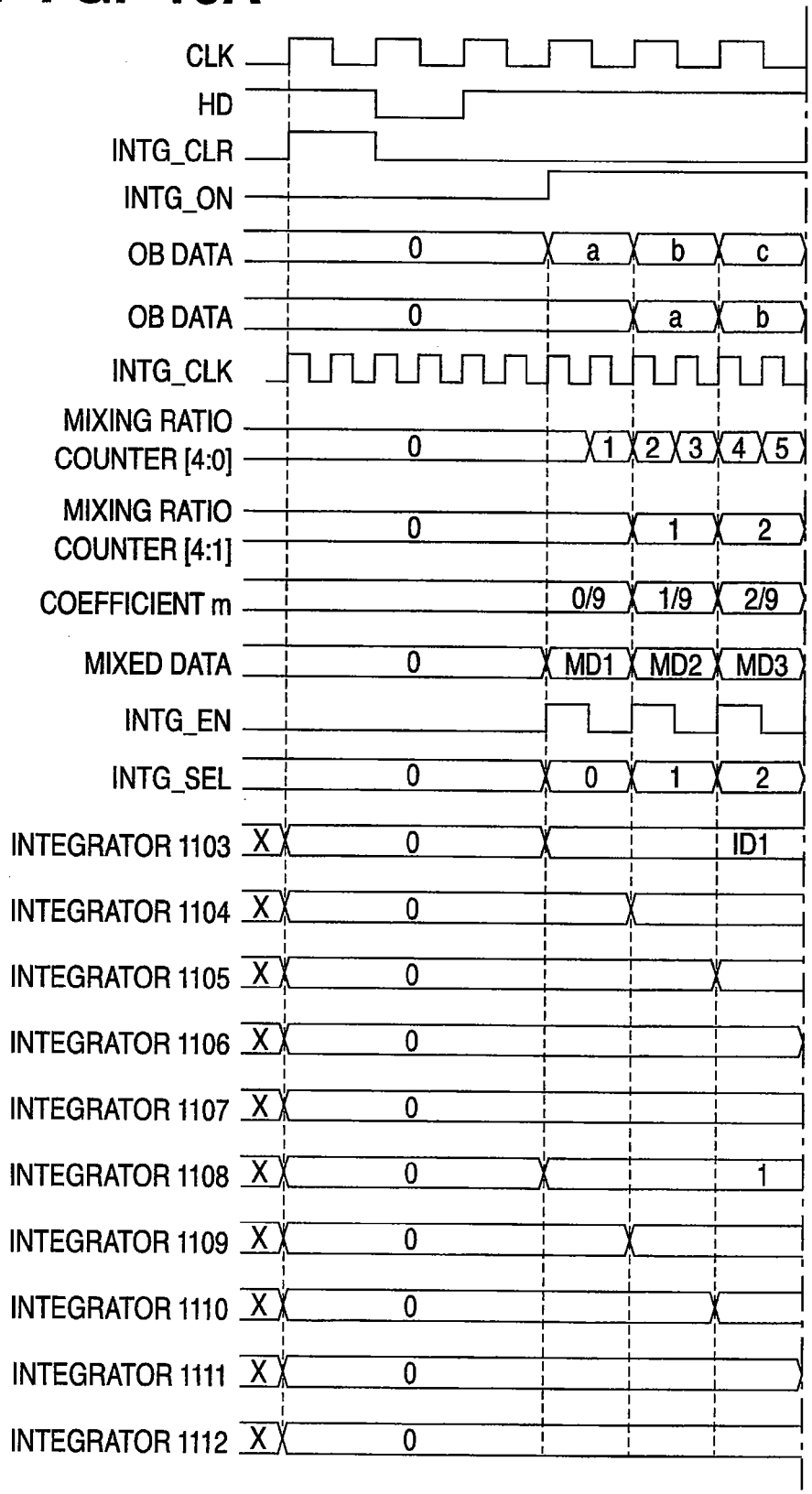
FIGS. 16A to 16C are time charts for explaining operations of an image processing apparatus according to the third embodiment of the present invention.
Figure 16B:
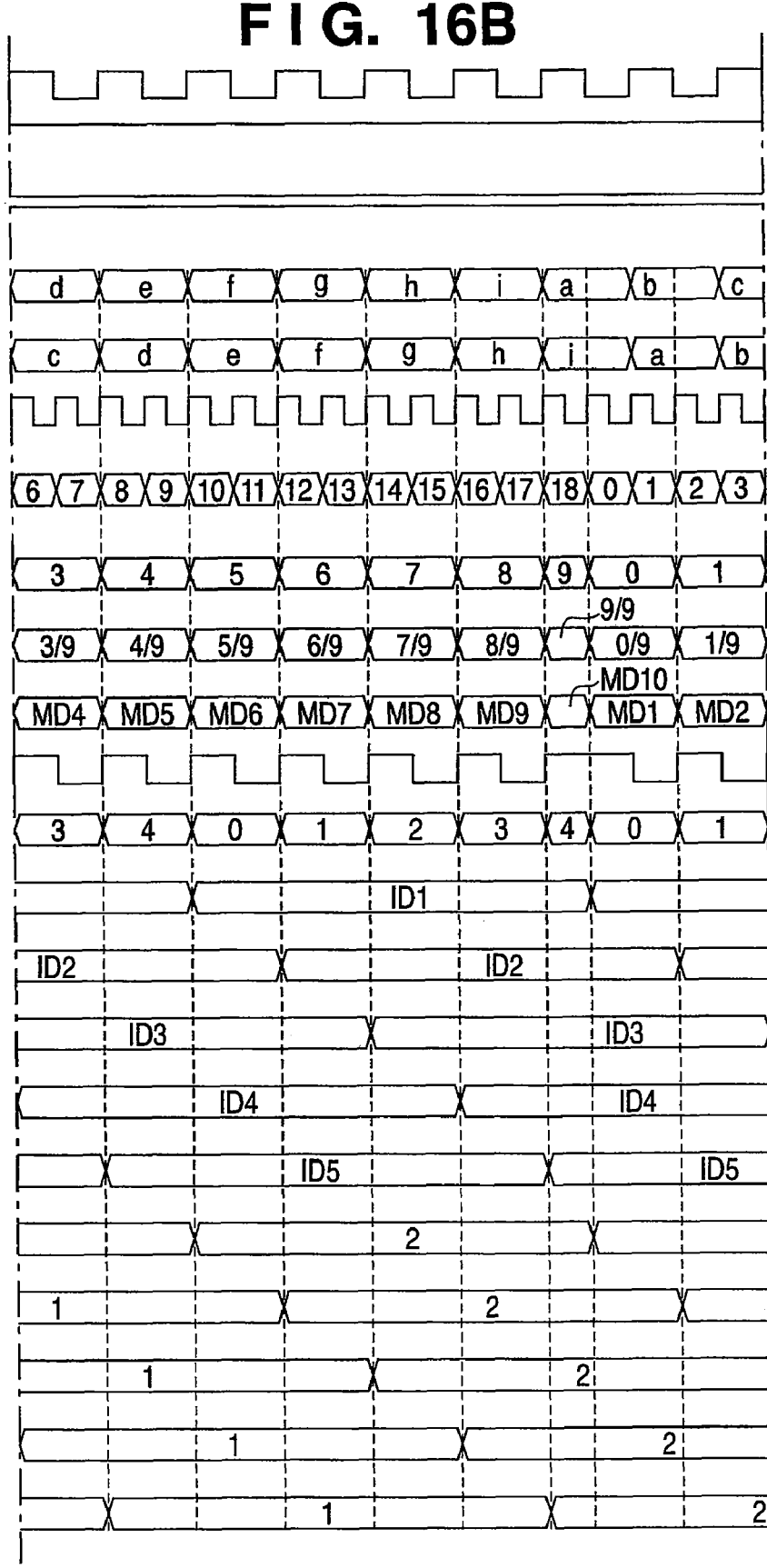
Figure 16C:
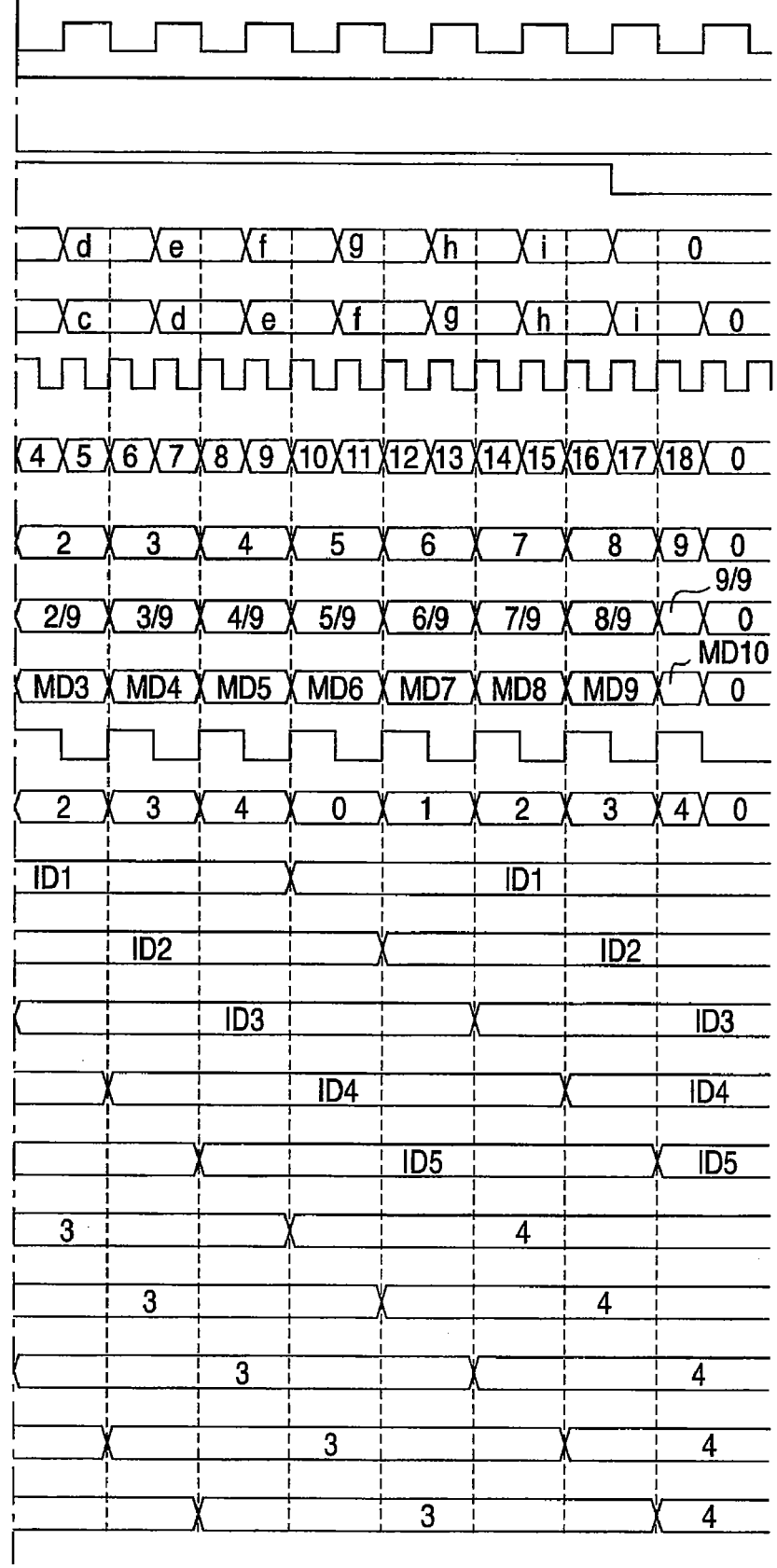

As shown in FIGS. 16A to 16C, when the signal INTG_CLR is at a high level, the integral values of the integrators 1403 to 1407 and the counter values of the counters 1408 to 1412 are reset to 0. The counter value of the mixing ratio counter 1424 is reset when the signal INTG_ON is at a low level, and when the signal INTG_ON reaches a high level, the mixing ratio counter 1424 is counted up in increments of 1 from 0 to 18 in accordance with the signal INTG_CLK. The bit width of the counter values of the mixing ratio counter 1424 is outputted at 5 bits, wherein the high 4 bits are used as a coefficient "m" while an inversion of the low 1 bit is used as a signal INTG_EN. When the mixing ratio counter 1424 has counted to 18 and becomes 0 at the next signal INTG_CLK, the signal INTG_EN consecutively becomes 1, which means that integration will be performed twice during one clock.

The output value of the mixing ratio counter 1424 is divided by the denominator d=9 of the coefficient by a divider 1425. The division result of the divider 1425 is outputted to the mixer 1401 as the coefficient "m". Pixel data is masked by the signal INTG_ON, and inputted as optical black pixel data OB1 to the mixer 1401 only when the signal INTG_ON is at a high level. At the same time, optical black pixel data OB1 and the signal INTG_ON are delayed by one pixel and inputted as optical black pixel data OB2 to the mixer 1401. A value of mixed data MD is obtained at the mixer circuit 1401 by adding the result of multiplying optical black pixel data OB1 by a coefficient (1−m) to the result of multiplying optical black pixel data OB2 by the coefficient "m". Therefore, an equation for calculating mixed data MD may be expressed as follows.

Mixed data $MD=$optical black pixel data $OB1\times(1-m)+$ optical black pixel data $OB2\times m$.

A maximum value of the mixing ratio counter 1424 and the value of the denominator "d" of the coefficient are determined by dividing the number of pixels in a beat noise cycle by the number of noise data pixels, and are set by the system controller 110.

As shown in FIGS. 16A to 16C, the signal INTG_EN is at a high level for the integrators 1403 and 1407, and an integrator specified by the signal INTG_SEL integrates mixed data outputted from the distributing circuit 1402. The mixed data MD1 and the mixed data MD6 are in the same beat noise phase and are therefore distributed by the distributing circuit 1402 to the integrator 1403 shown in FIG. 14 for integration. The integration result shall be denoted as integrated data ID1 shown in FIG. 13B. In the same manner, mixed data MD2 and mixed data MD7 are integrated by the integrator 1404 to become integrated data ID2, while mixed data MD3 and mixed data MD8 are integrated by the integrator 1405 to become integrated data ID3. Furthermore, mixed data MD4 and mixed data MD9 are integrated by the integrator 1406 to become integrated data ID4, while mixed data MD5 and mixed data MD10 are integrated by the integrator 1407 to become integrated data ID5.

As shown in FIGS. 16A to 16C, the signal INTG_EN is at a high level for the counters 1408 to 1412, and a counter specified by the signal INTG_SEL counts up by an increment of 1. The counter 1408 counts the number of integrations performed by the integrator 1403. The integrated data ID1 is divided by the count value of the counter 1408 to determine normalized data ND1 shown in FIG. 13B. In the same manner, normalized data ND2 is determined by dividing integrated data ID2 by the count value of the counter 1409, while normalized data ND3 is determined by dividing integrated data ID3 by the count value of the counter 1410. Similarly, normalized data ND4 is determined by dividing integrated data ID4 by the count value of the counter 1411, while normalized data ND5 is determined by dividing integrated data ID5 by the count value of the counter 1412.

A minimum value detecting circuit 1418 shown in FIG. 14 detects a minimum value MIN from the five units of normalized data. Offset of beat noise is eliminated at subtracters 1419 to 1423 by respectively subtracting the minimum value MIN from the five units of normalized data. Five units of noise data NZ1 to NZ5 are hereby determined.

Next, correction values A, B, C, D and E shown in FIG. 13B are determined. The correction values A to E are determined by weighting the noise data NZ1 to NZ5 as represented by the following equations. Note that correction values F, G, H and I have not been illustrated.

Correction value $A=$noise data $NZ1\times(9/10-$horizontal interval remainder $k\times$phase$)+$noise data $NZ2\times(1/10+$horizontal interval remainder $k\times$phase$)$ Correction value $B=$noise data $NZ2\times(8/10-$horizontal interval remainder $k\times$phase$)+$noise data $NZ3\times(2/10+$horizontal interval remainder $k\times$phase$)$ Correction value $C=$noise data $NZ3\times(7/10-$horizontal interval remainder $k\times$phase$)+$noise data $NZ4\times(3/10+$horizontal interval remainder $k\times$phase$)$ Correction value $D=$noise data $NZ4\times(6/10-$horizontal interval remainder $k\times$phase$)+$noise data $NZ5\times(4/10+$horizontal interval remainder $k\times$phase$)$ Correction value $E=$noise data $NZ5\times(5/10-$horizontal interval remainder $k\times$phase$)+$noise data $NZ6\times(5/10+$horizontal interval remainder $k\times$phase$)$ Correction value $F=$noise data $NZ6\times(4/10-$horizontal interval remainder $k\times$phase$)+$noise data $NZ7\times(6/10+$horizontal interval remainder $k\times$phase$)$ Correction value $G=$noise data $NZ7\times(3/10-$horizontal interval remainder $k\times$phase$)+$noise data $NZ8\times(7/10+$horizontal interval remainder $k\times$phase$)$ Correction value $H=$noise data $NZ8\times(2/10-$horizontal interval remainder $k\times$phase$)+$noise data $NZ9\times(8/10+$horizontal interval remainder $k\times$phase$)$ Correction value $I=$noise data $NZ9\times(1/10-$horizontal interval remainder $k\times$phase$)+$noise data $NZ10\times(9/10+$horizontal interval remainder $k\times$phase$)$ The above calculations are performed by the mixer 1511 shown in FIG. 15. The coefficients by which the respective noise data NZ are multiplied are generated by the mixing ratio circuit 1510 as described below. The remainder calculator 1509 outputs a horizontal interval remainder "k" ($0\leq k\leq 9$), which is a remainder of a division of the counter value of the horizontal interval counter 1504 by 10 that is the denominator of the coefficient, and sends the output to the mixing ratio circuit 1510.

The mixing ratio circuit 1510 multiplies the horizontal interval remainder "k" with the signal "phase". The signal "phase" is a value of the phase by which beat noise deviates per horizontal interval of image data. When the beat noise cycle is not an integral multiple of a pixel, the value of the signal "phase" also may not be an integral multiple. Multiplication of the horizontal interval remainder "k" and a value of the signal "phase" is performed using the number of fixed points. The integral part is truncated when the multiplication result is 1 or more so that the multiplication result is always a decimal that is smaller than 1.

The reason for arranging multiplication results to always be decimals smaller than 1 will now be described with reference to FIG. 13C. FIG. 13C depicts phase differences of noise data (k=1, 2, 3) with respect to reference noise data (k=0) when the value of the signal "phase" is 3/10. Noise data shifts leftward by 3/10 pixels as the value of "k" increases. Compared to the reference noise data (k=0), the phases of noise data corresponding to k=1, 2, 3 shift by a value obtained by multiplying the horizontal interval remainder "k" and a value of the signal "phase". At k=3, noise phase has shifted by exactly a single noise data pixel from k=0. Accordingly, when "k" is an integer equal to or greater than 4, the phase difference will be equal to or greater than a single noise data pixel.

Therefore, in a case where the phase difference between the reference noise data and noise data subsequent to the first horizontal interval is one pixel or more, as described above, the mixing ratio circuit 1510 truncates the integral part to obtain a decimal that is smaller than 1. In this manner, weighting may be performed on noise data so as to correspond to phase changes per horizontal interval when determining a correction value.

A case where the value of the signal "phase" is 3/10 has been described above. However, when the value of the signal "phase" is equal to or greater than 1, truncating the integral part of the value of the signal "phase" and calculating only the decimal part of the value of the signal "phase" by the mixing ratio circuit 1510 shall suffice.

Noise data selected by the selectors 1501 and 1502 must be shifted by exactly the phase difference that is an integer equal to or greater than 1 pixel which is truncated by the mixing ratio circuit 1510. A method of selecting two adjacent units of noise data required to determine the correction values A, B, C, D and E as selection control signals for the selectors 1501 and 1502 will now be described with reference to FIG. 15.

An adder 1514 adds a counter value of the pixel counter and the value of the signal initial_phase, and sends the addition result to an adder 1506. A multiplier 1505 multiplies the counter value of the horizontal interval counter 1504 by the value of the phase difference signal "phase" per horizontal period. When the value of the signal "phase" is 3/10, the multiplier 1505 performs multiplication of fixed decimal points and outputs only the integral part of the multiplication results. This value is equivalent to the value of the integral part truncated by the mixing ratio circuit 1510.

Figure 17:
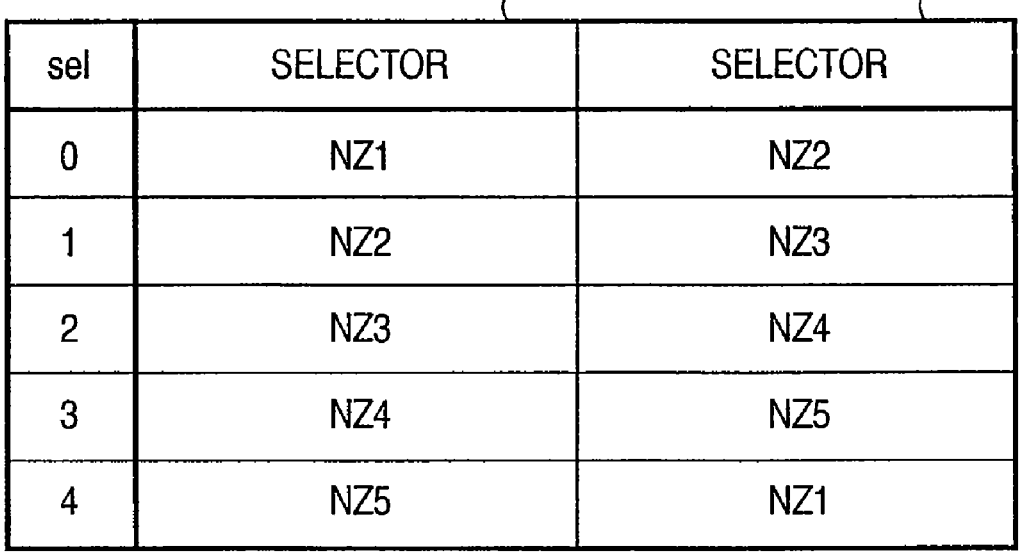
FIG. 17 is a diagram for explaining operations of the third embodiment of the present invention and which shows a relationship between noise data selected by selectors 1501 and 1502 and selection control signals.

The adder 1506 adds the output of the multiplier 1505 and the output of the adder 1514. A remainder calculator 1507 outputs the remainder of a division of the addition results of the adder 1506 with 5, which is the number of pixels of noise data, as a signal "sel" that is a selection control signal. The selectors 1501 and 1502 select noise data in accordance with the signal "sel" that is a selection control signal shown in FIG. 17. Correction values A, B, C, D and E are determined by the mixer 1511 and are subtracted from effective pixel data by a subtracter 1512.

When the signal REMV_ON is at a high level, the selector 1513 selects an output of the subtracter 1512, and outputs the same as corrected image data. On the other hand, when the signal REMV_ON is at a low level, pixel data inputted from the A/D converter circuit 106 is selected and outputted without modification.

Beat noise elimination may also be performed on image data in which respective field images read out from a multi-field read type image sensor are framed on a memory, as was described with respect to the second embodiment. In this case, replacing the multiplier 1505 shown in FIG. 15 with the configuration shown in FIG. 12 shall suffice.

Furthermore, the object of the present invention may also be achieved by supplying a storage medium that stores a program code capable of realizing the functions of the above-described embodiments to a system or an apparatus. In other words, the object of the present invention may obviously be achieved by having a computer (or a CPU or an MPU) of the system or the apparatus read out and execute the program code stored in the storage medium. In this case, the program code itself that is read out from the storage medium achieves the functions of the above mentioned embodiments, while the storage medium storing the program code will compose the present invention.

Storage media usable to supply the program may include, for instance, a flexible disk, a hard disk, an optical disk, a magneto-optical disk, a CD-ROM, a CD-R, a magnetic tape, a non-volatile semiconductor memory card, and a ROM. In addition, the functions of the above-described embodiments may be achieved by executing a program code read out by a computer.

In such cases, it is needless to say that the functions of the above-described embodiments may also be achieved by having an OS (operating system) or the like running on the computer perform a portion of or all of the actual processing based on instructions contained in the program code.

Moreover, there may be cases where a program code that is read out from the storage medium is written into a memory provided on a function extension board inserted into a computer or a function extension unit connected to the computer. It is needless to say that the functions of the above-described embodiments may also be achieved by having a CPU or the like provided on the function extension board or the function extension unit perform a portion of or all of the actual processing based on instructions contained in the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-193234, filed Jul. 13, 2006 which is hereby incorporated by reference herein in its entirety.

What is claimed is:
1. An image processing apparatus comprising:
 a distributing unit that distributes into a plurality of integrating units a plurality of data obtained from output signals from pixels in an optical black area of an image sensor in accordance with a cycle of a beat noise component;
 a first calculating unit that normalizes a plurality of integration values obtained by said plurality of integrating units by dividing each of the plurality of integration values by the number of integrations;

a second calculating unit that subtracts a minimum value of the plurality of normalized integration values from the plurality of normalized integration values to obtain noise data indicating the beat noise component included in the data obtained from the image sensor;

a selecting unit that selects noise data out of the noise data obtained by said second calculating unit which corresponds to a phase of a beat noise component included in a plurality of data obtained from pixels in an effective area of the image sensor; and a correction unit that corrects the data obtained from the pixels in the effective area of the image sensor using the noise data selected by said selecting unit.

2. The image processing apparatus according to claim 1, wherein said selecting unit selects two noise data out of the noise data obtained by said second calculating unit in accordance with the beat noise component included in the plurality of data obtained from the pixels in the effective area of the image sensor, and said correction unit generates a correction value by adding with weight the two noise data selected by said selecting unit and subtracts the correction value from the data obtained from each pixel in the effective area of the image sensor.

3. The image processing apparatus according to claim 2 further comprising a mixed data generation unit that generates mixed data using output signals from the pixels in the optical black area of the image sensor in such a way that a number of the mixed data generated from a predetermined number of the output signals from the pixels in the optical black area is larger than the predetermined number, wherein said distributing unit distributes the mixed data into the plurality of integrating units in accordance with the cycle of the beat noise component.

4. The image processing apparatus according to claim 3, wherein said second calculating unit calculates the noise data a number of which is the same as the mixed data generated per the predetermined number of the output signals from the pixels in the optical black area of the image sensor, and said correction unit generates the correction values from the noise data in such a way that the predetermined number of correction values are generated from the noise data calculated per the predetermined number of the output signals from the pixels in the optical black area of the image sensor.

5. A method of controlling an image processing apparatus comprising:

a distributing step of distributing into a plurality of integrating units a plurality of data obtained from output signals from pixels in an optical black area of an image sensor in accordance with a cycle of a beat noise component;

a first calculating step of normalizing a plurality of integration values obtained by said plurality of integrating units by dividing each of the plurality of integration values by the number of integrations;

a second calculating step of subtracting a minimum value of the plurality of normalized integration values from the plurality of normalized integration values to obtain noise data indicating the beat noise component included in the data obtained from the image sensor;

a selecting step of selecting noise data out of the noise data obtained in said second calculating step which corresponds to a phase of a beat noise component included in a plurality of data obtained from pixels in an effective area of the image sensor; and a correction step of correcting the data obtained from the pixels in the effective area of the image sensor using the noise data selected in said selecting step.

6. The method according to claim 5, wherein said selecting step selects two noise data out of the noise data obtained in said second calculating step in accordance with the beat noise component included in the plurality of data obtained from the pixels in the effective area of the image sensor, and said correction step generates a correction value by adding with weight the two noise data selected in said selecting unit step subtracts the correction value from the data obtained from each pixel in the effective area of the image sensor.

7. The method according to claim 6 further comprising a mixed data generation step of generating mixed data using output signals from the pixels in the optical black area of the image sensor in such a way that a number of the mixed data generated from a predetermined number of the output signals from the pixels in the optical black area is larger than the predetermined number, wherein said distributing step distributes the mixed data into the plurality of integrating units in accordance with the cycle of the beat noise component.

8. The method according to claim 7, wherein said second calculating step calculates the noise data a number of which is the same as the mixed data generated per the predetermined number of the output signals from the pixels in the optical black area of the image sensor, and said correction step generates the correction values from the noise data in such a way that the predetermined number of correction values are generated from the noise data calculated per the predetermined number of the output signals from the pixels in the optical black area of the image sensor.

* * * * *